April 29, 1930.　　　C. S. BATDORF　　　1,756,478
METHOD OF AND MACHINE FOR MAKING CUPS
Filed Sept. 9, 1925　　　15 Sheets-Sheet 1
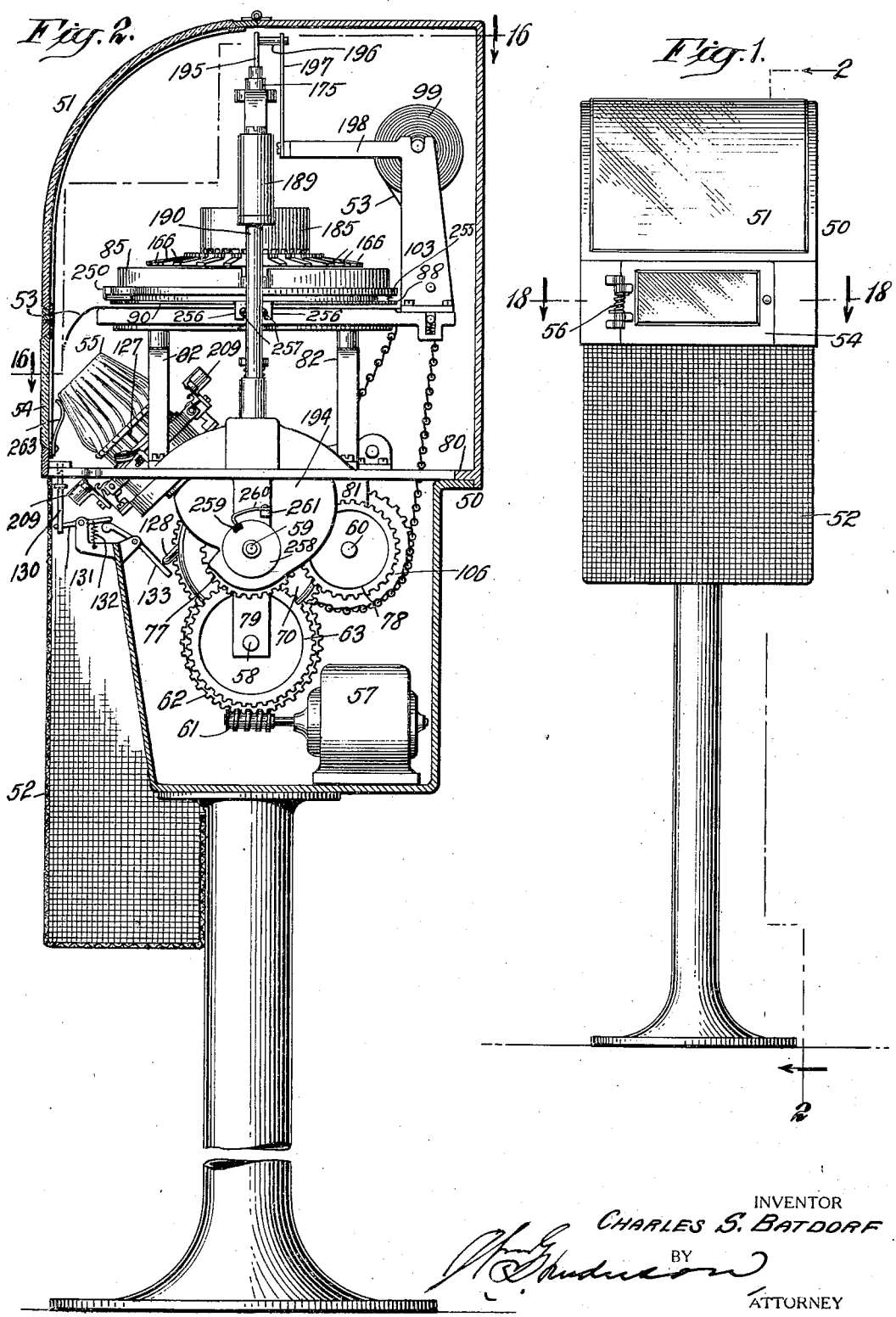
INVENTOR
CHARLES S. BATDORF
BY
ATTORNEY April 29, 1930.  C. S. BATDORF  1,756,478
METHOD OF AND MACHINE FOR MAKING CUPS
Filed Sept. 9, 1925  15 Sheets-Sheet 2

INVENTOR
CHARLES S. BATDORF
BY
ATTORNEY

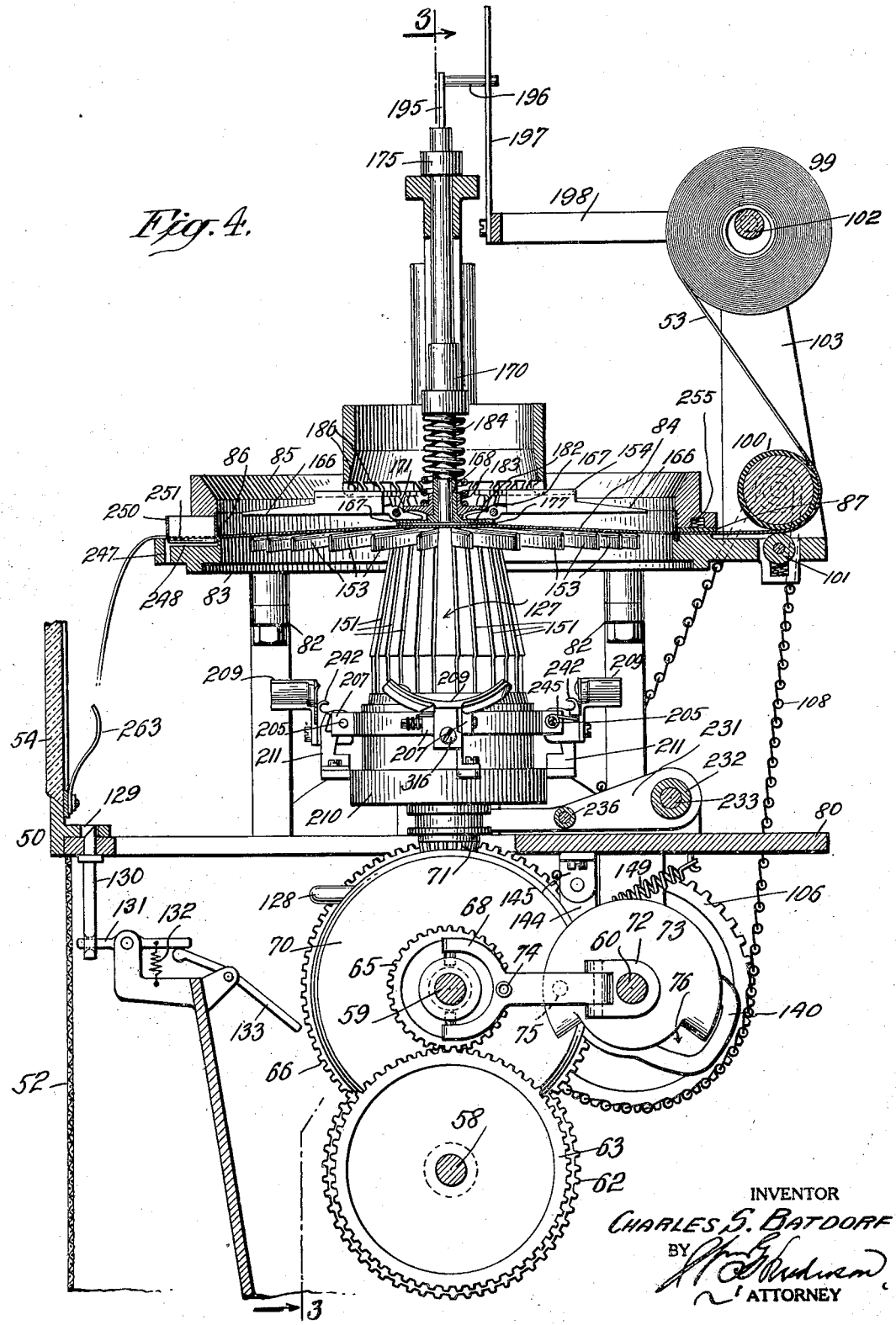

April 29, 1930.   C. S. BATDORF   1,756,478
METHOD OF AND MACHINE FOR MAKING CUPS
Filed Sept. 9, 1925   15 Sheets-Sheet 4
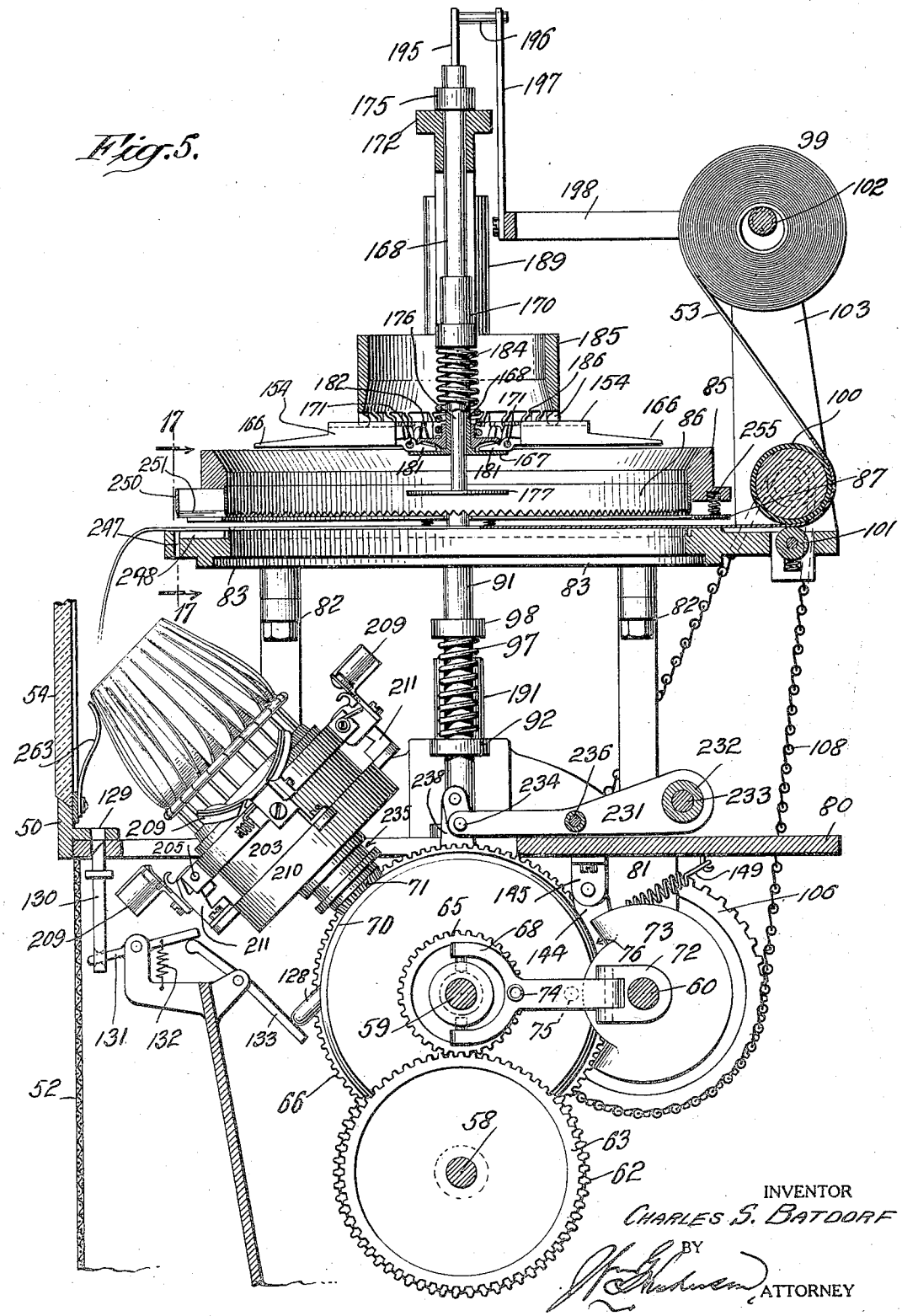

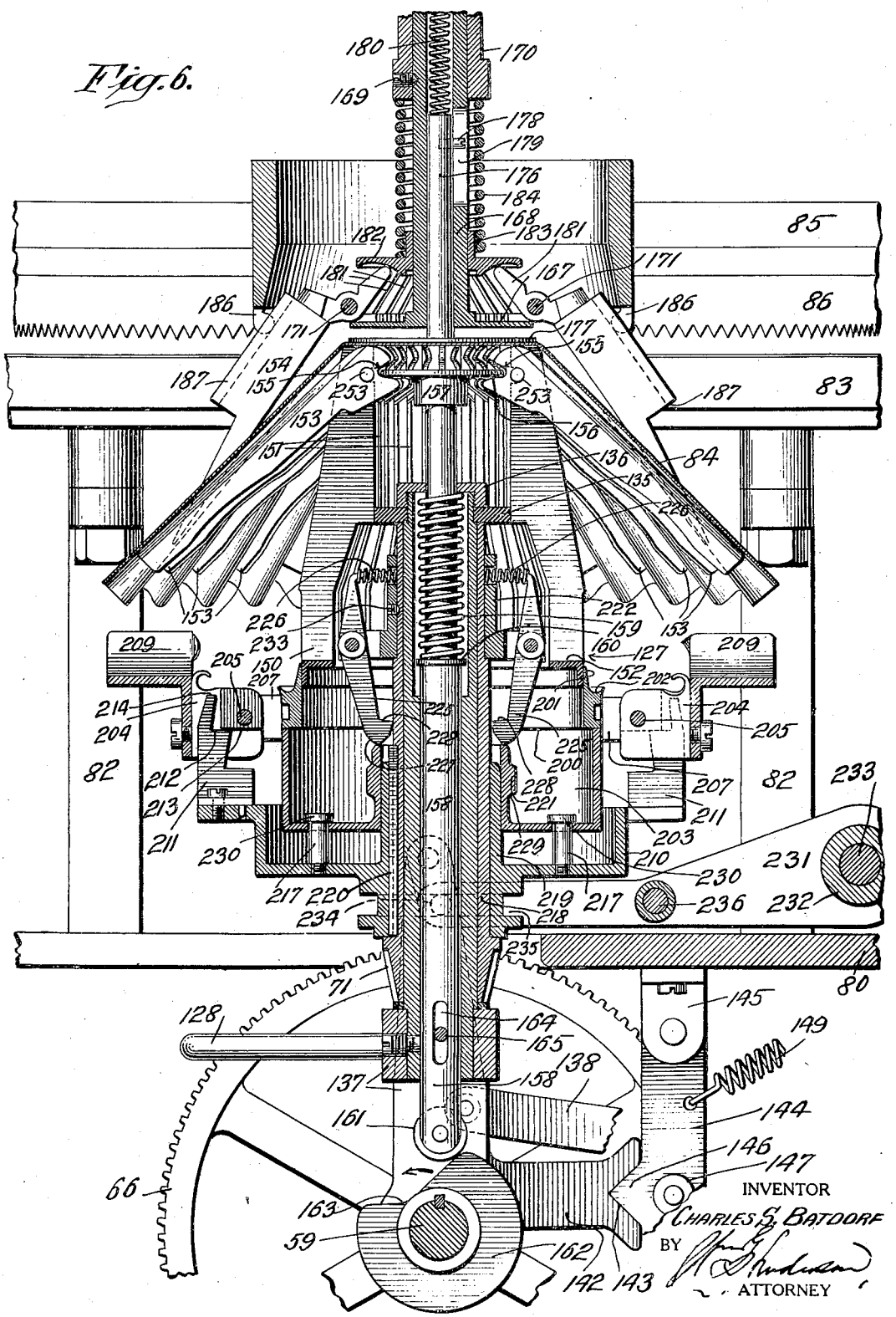

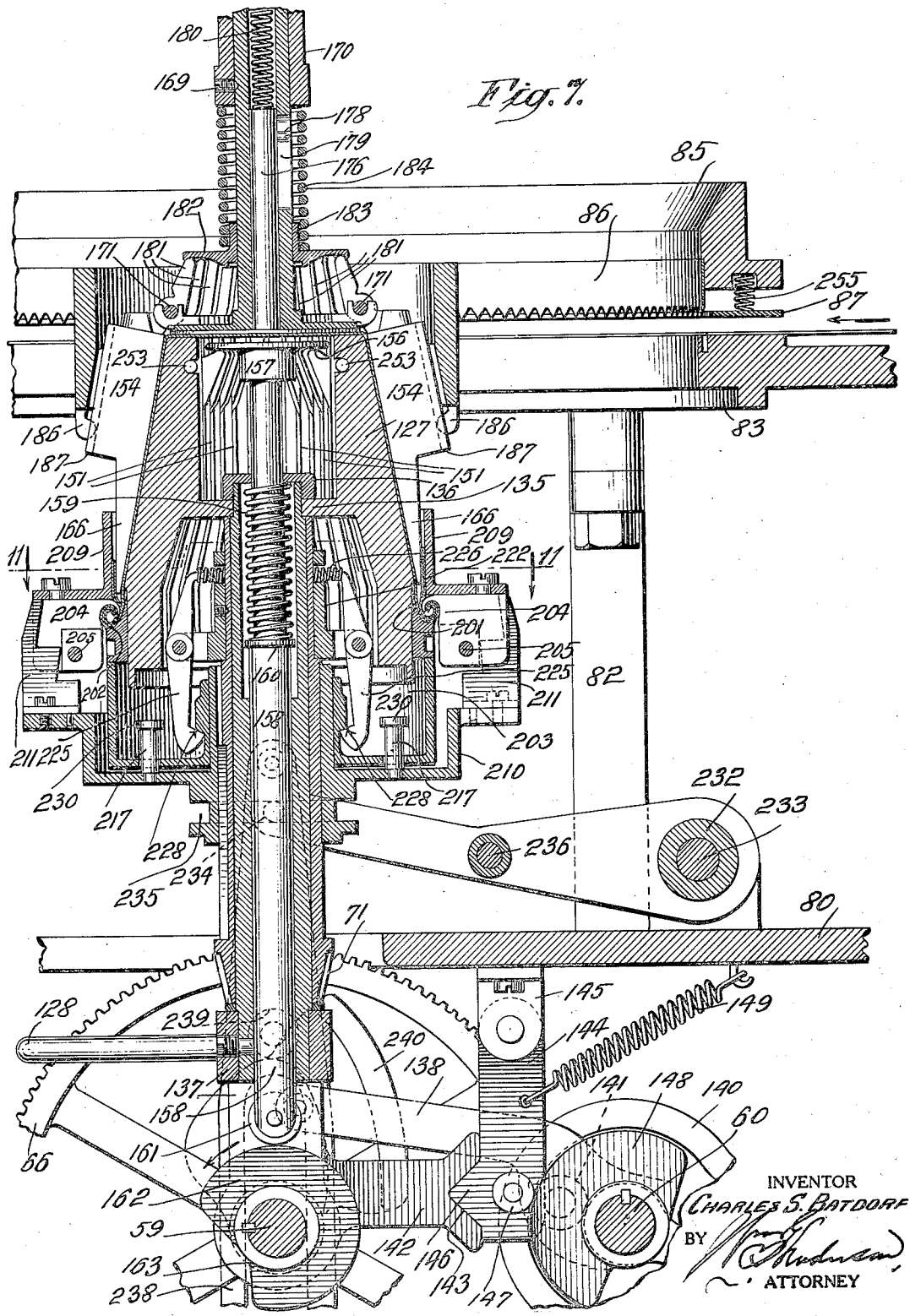

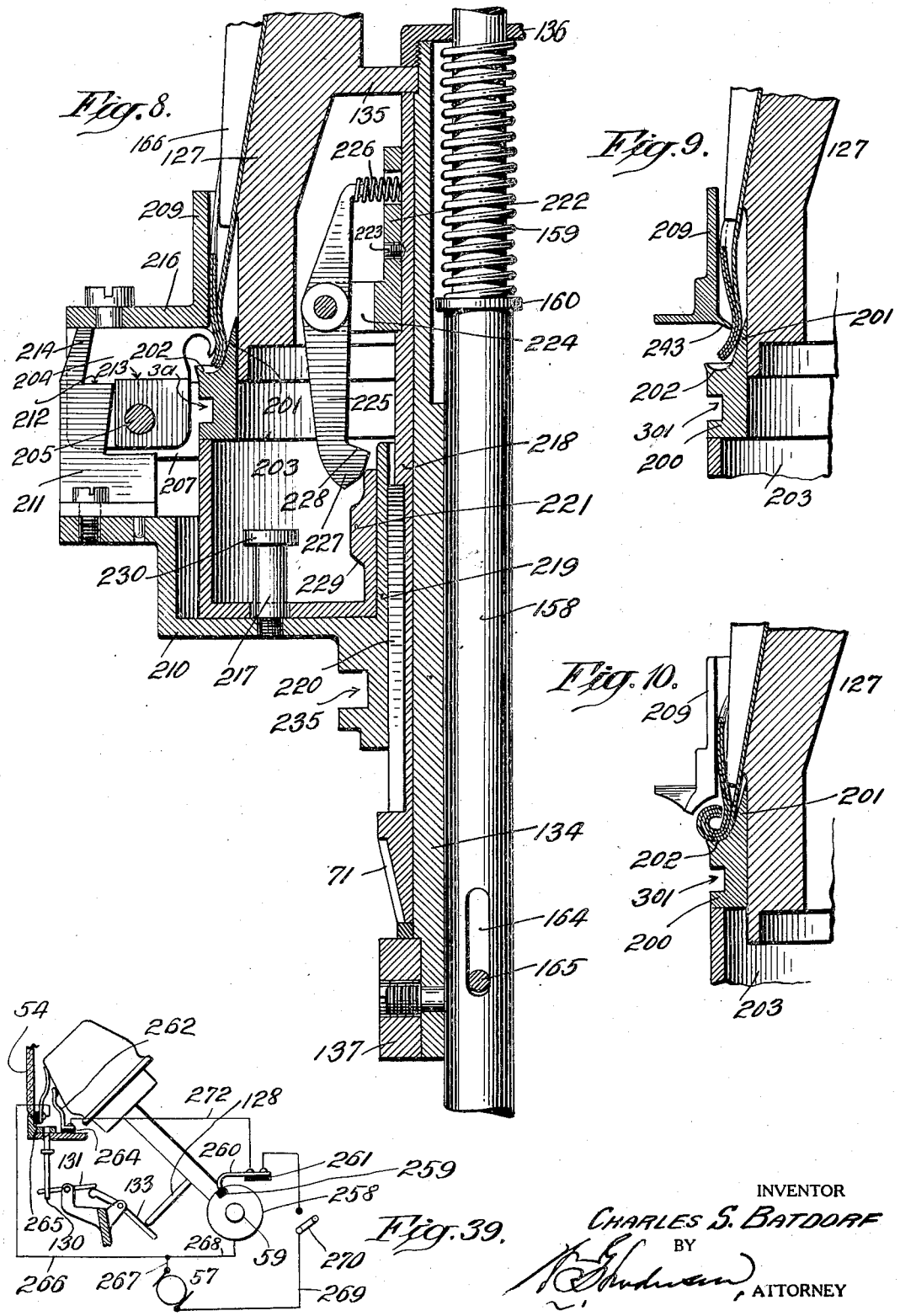

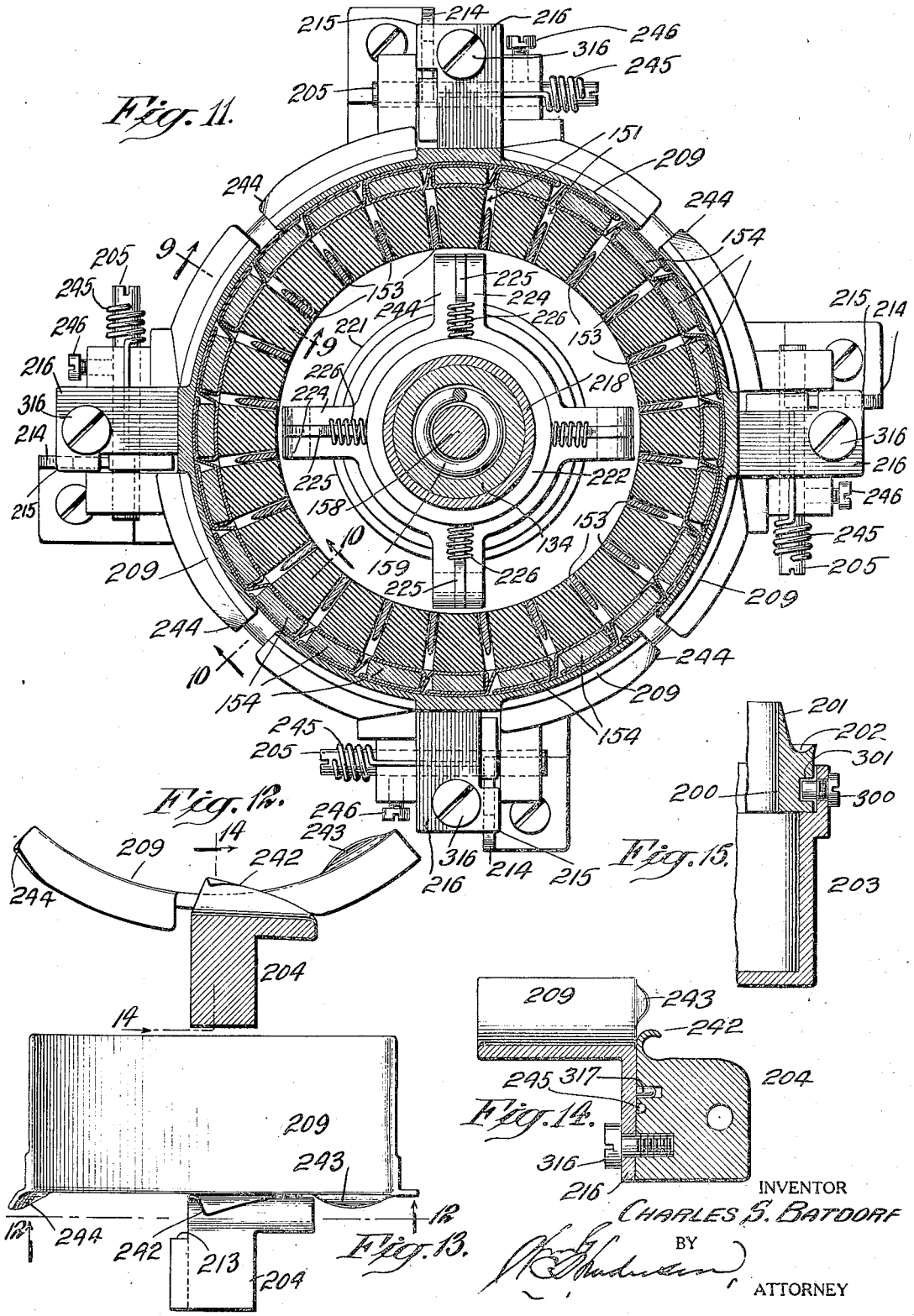

April 29, 1930.　　　C. S. BATDORF　　　1,756,478
METHOD OF AND MACHINE FOR MAKING CUPS
Filed Sept. 9, 1925　　　15 Sheets-Sheet 10
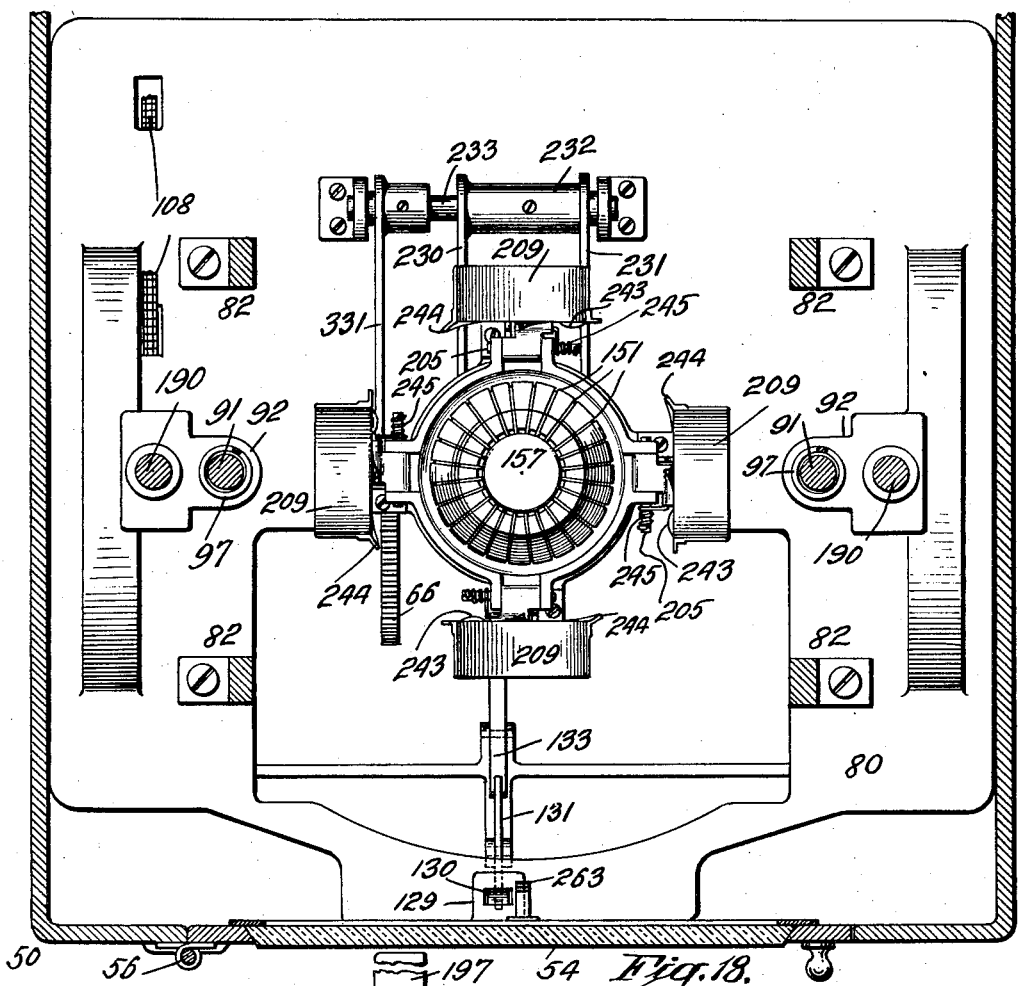
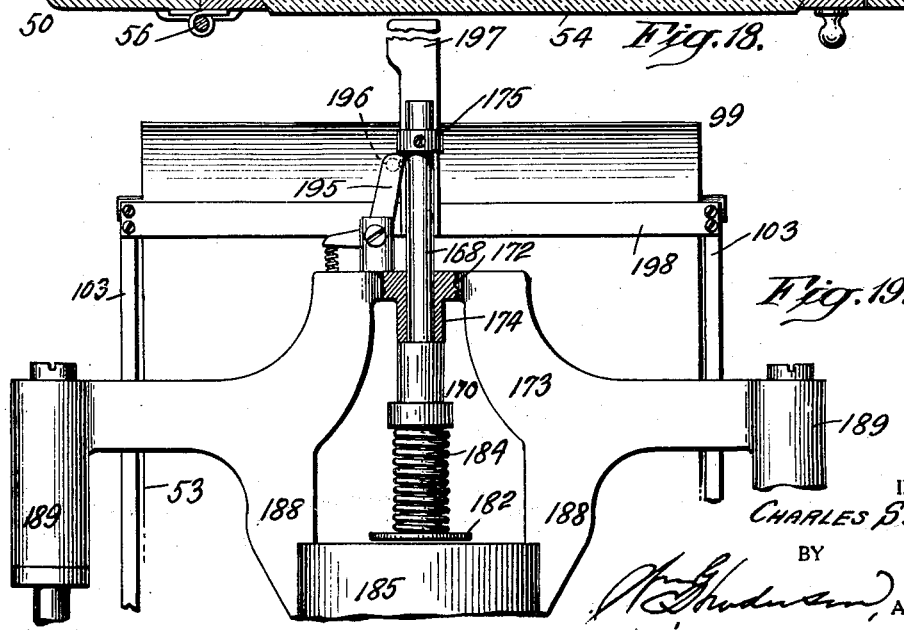
INVENTOR
CHARLES S. BATDORF
BY
ATTORNEY April 29, 1930.  C. S. BATDORF  1,756,478
METHOD OF AND MACHINE FOR MAKING CUPS
Filed Sept. 9, 1925  15 Sheets-Sheet 11
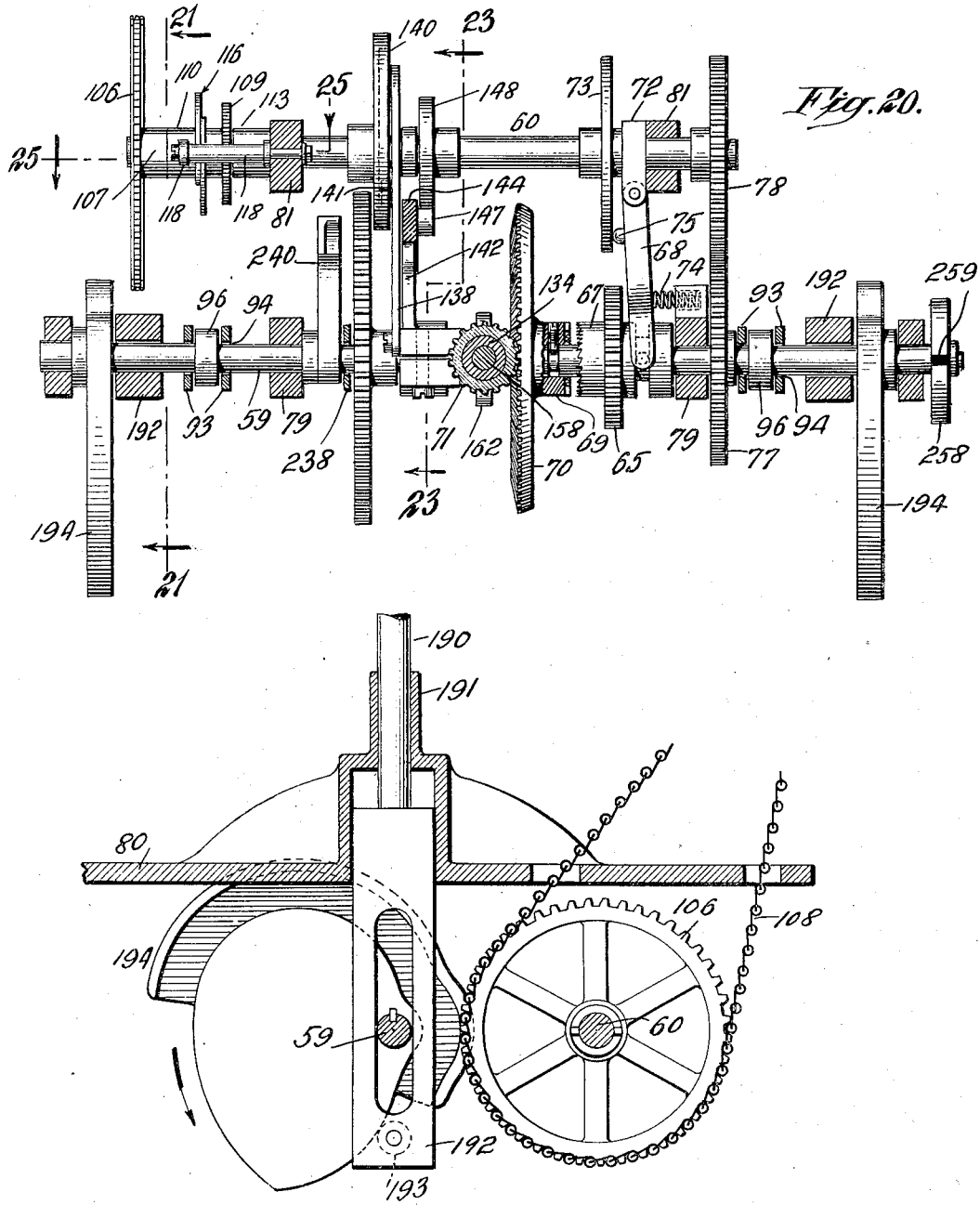

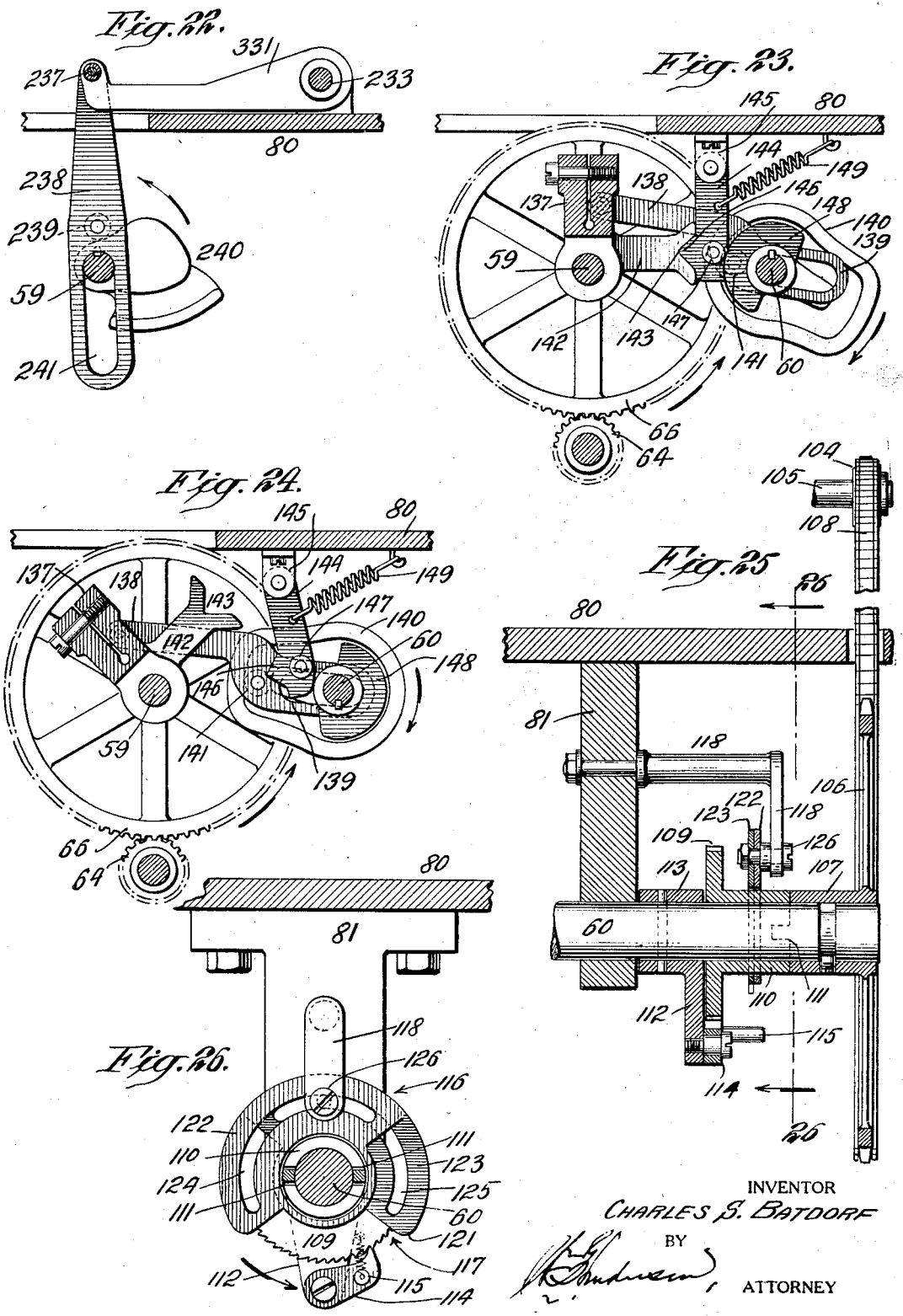

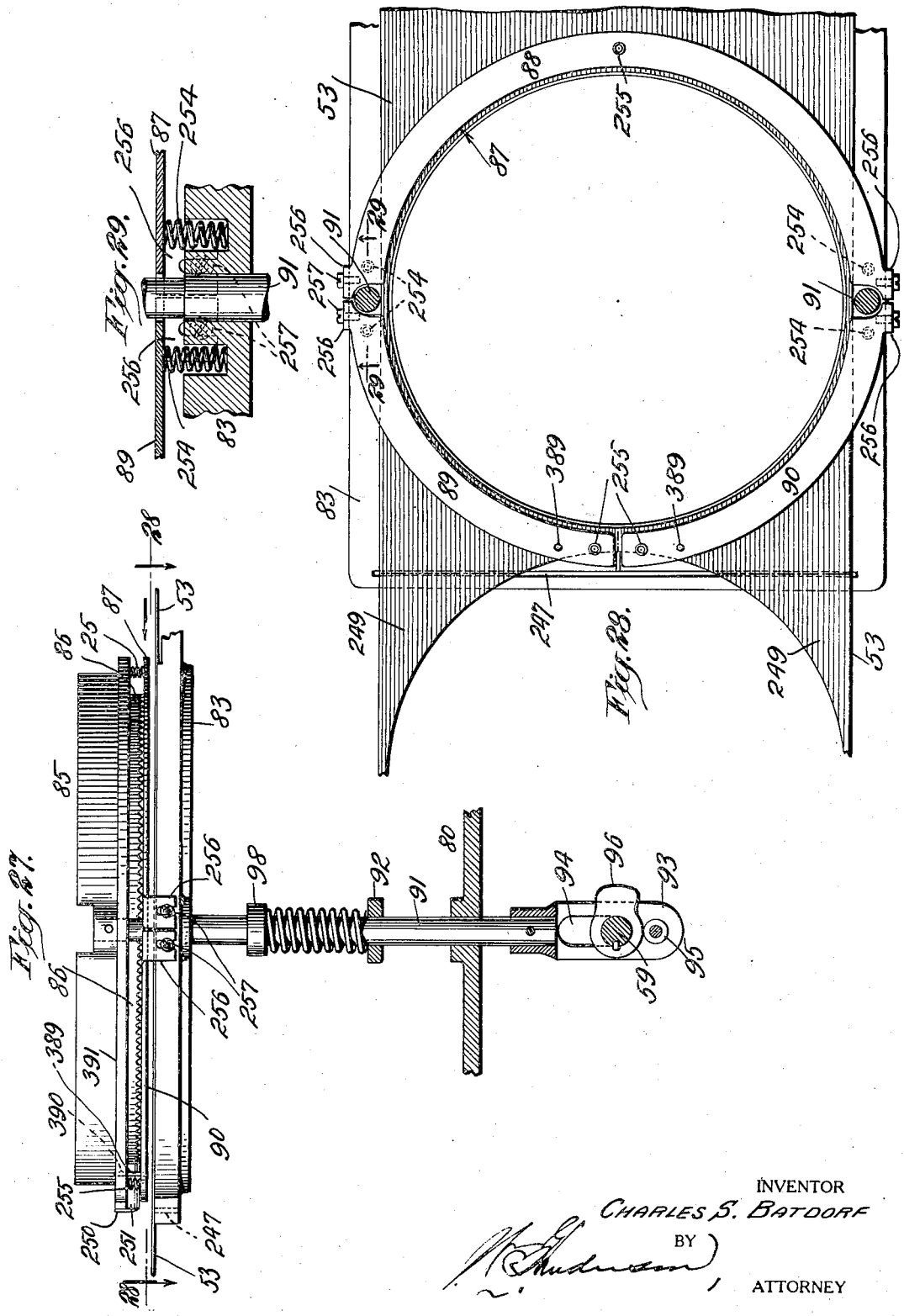

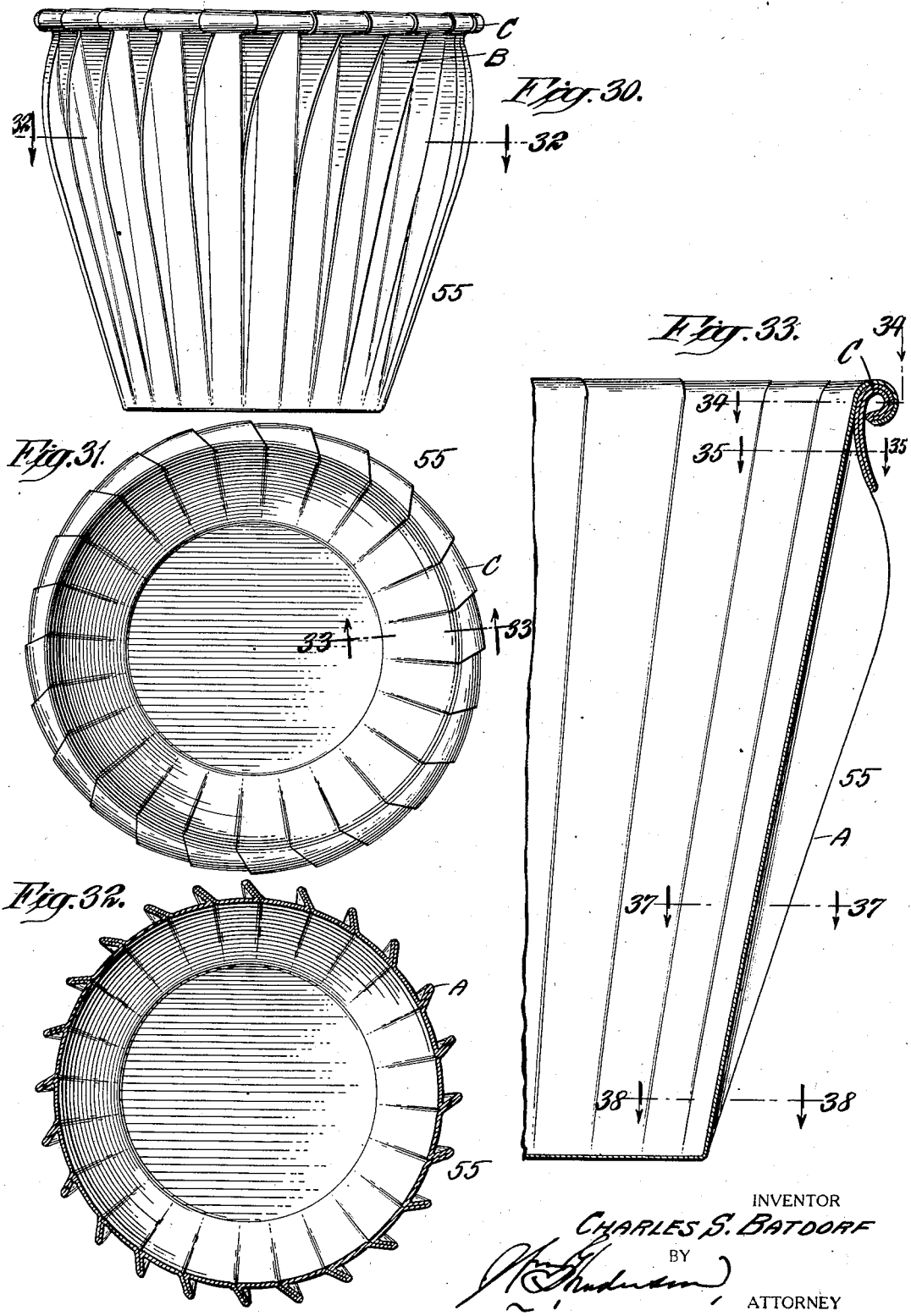

Patented Apr. 29, 1930

1,756,478

UNITED STATES PATENT OFFICE

CHARLES S. BATDORF, OF BROOKLYN, NEW YORK

METHOD OF AND MACHINE FOR MAKING CUPS

Application filed September 9, 1925. Serial No. 55,301.

The invention pertains to a method and an automatic machine for making paper drinking cups and like containers from paper disks or disk-blanks cut, as required, from a strip of paper of appropriate width fed from a roll of the paper.

The machine comprises a number of novel features, and in its preferred form, the machine will be driven by an electric motor and make one complete cup and place the same in convenient cup-delivery position to be removed by hand, during each cycle of operation of the machine, the machine coming to rest at the end of each cycle of its operation.

Under the present invention a complete and finished self-sustaining cup of thin flexible material, such as paper, may be made from start to finish of the operation, that is, from the instant that the machine commences to make the cup to and including when the cup is delivered, this method of making the cup being performed from start to finish without halt; that is to say, the operation of the instrumentalities which manufacture this cup, although the instrumentalities work in sequence, is a continuous operation without interruption until that cup is actually delivered.

In the preferred embodiment of the invention the machine will be enclosed within a casing or cabinet having a door to be opened, when desired, for the removal of a finished cup then in cup-delivery position adjacent to said door and held on a conical head on which the cup was formed when the same was in cup-forming position and which on the completion of the cup moved to cup-delivery position adjacent to said door. The machine automatically comes to rest when the forming-head arrives with a finished cup at cup-delivery position, this being due to the electric circuit being broken at that particular time or at the end of the cycle of operation of the machine, and when said forming head, which is of metal, reaches cup-delivery position it presses the side of the cup against certain electric switch mechanism a portion of which is carried by the aforesaid door, the cup at this time insulating said head from said mechanism. On the opening of the door the switch mechanism carried by it is withdrawn from the cup and at that time no circuit can be established through the driving motor; on the removal of the cup from the forming-head and the closing of the door the switch carried by the door passes into electrical contact with the said head and thereby is established a circuit through the motor which then drives the machine through another cycle of operation to produce another cup and deliver the same into cup-delivery position adjacent to said closed door and against the switch mechanism located adjacent thereto. The aforesaid door is latched by mechanism concealed within the enclosing cabinet, and this latch mechanism is automatically released, to permit the opening of the door, by the mechanism carrying the finished cup to cup-delivery position.

One object of the invention is therefore to provide a machine which will produce a cup and come to rest until said cup has been withdrawn for use and will then produce another cup and so on as the finished cups are successively withdrawn. The machine is thus a cup making and dispensing machine, a fresh cup being made as each cup is withdrawn for use.

The cup produced by the machine is of special character, being formed in its sides with certain flutes and plaits and at its mouth edge or lip with a special rounded beading, the object being to provide a durable sustaining cup capable of convenient handling and use, from a comparatively inexpensive grade of paper.

The machine comprises a number of co-operative features and sub-combinations of parts, among which are mechanism for intermittently feeding a strip of paper from a roll across an elevated bed plate having a circular opening therein, cutter mechanism for cutting from said strip a circular disk or cup-blank, means for maintaining said forming head stationary in vertical position centrally below said circular opening for a given period, a presser foot for pressing the center of said disk or cup-blank against the then upper end of said head, a set of radial thin fluting blades carried by said head and to be spread out on edge below said paper disk, a set of radial creasing arms spread out above said paper disk and arranged in staggered relation to said fluting blades, means for closing said creasing arms downwardly to crease or flute the paper disk on and between said blades and folding said blades into vertical slots or recesses in said forming head, leaving the fluted disk, then of truncated conical outline, bound by said arms against the sides of said forming head, finishing tools for ironing down the flutes of the cup-blank at and adjacent to the open end thereof to form overlapping flattened plaits and forming a rolled beading at said open end, thereby finishing the cup on said forming head, means for retiring said creasing arms and said finishing tools from the finished cup and means for then moving said head from its vertical cup-forming position to its forward cup-delivery position.

The machine embodies many novel features for giving effect to the main mechanisms hereinbefore referred to and which at each successive cycle of the operation of the machine assure the correct forming of a cup on the forming-head and the movement of said head to carry the cup to cup-delivery position.

The invention will be fully understood from the detailed description hereinafter presented, reference being had to the accompanying drawings, in which:

Fig. 1 is a front elevation of a machine constructed in accordance with and embodying my invention;

Fig. 2 is a vertical section, on a larger scale, through the same, taken on the dotted line 2—2 of Fig. 1, the mechanism of the machine being shown as having completed a cycle of operation and the forming-head being shown as holding a finished cup in cup-delivery position;

Figure 3:
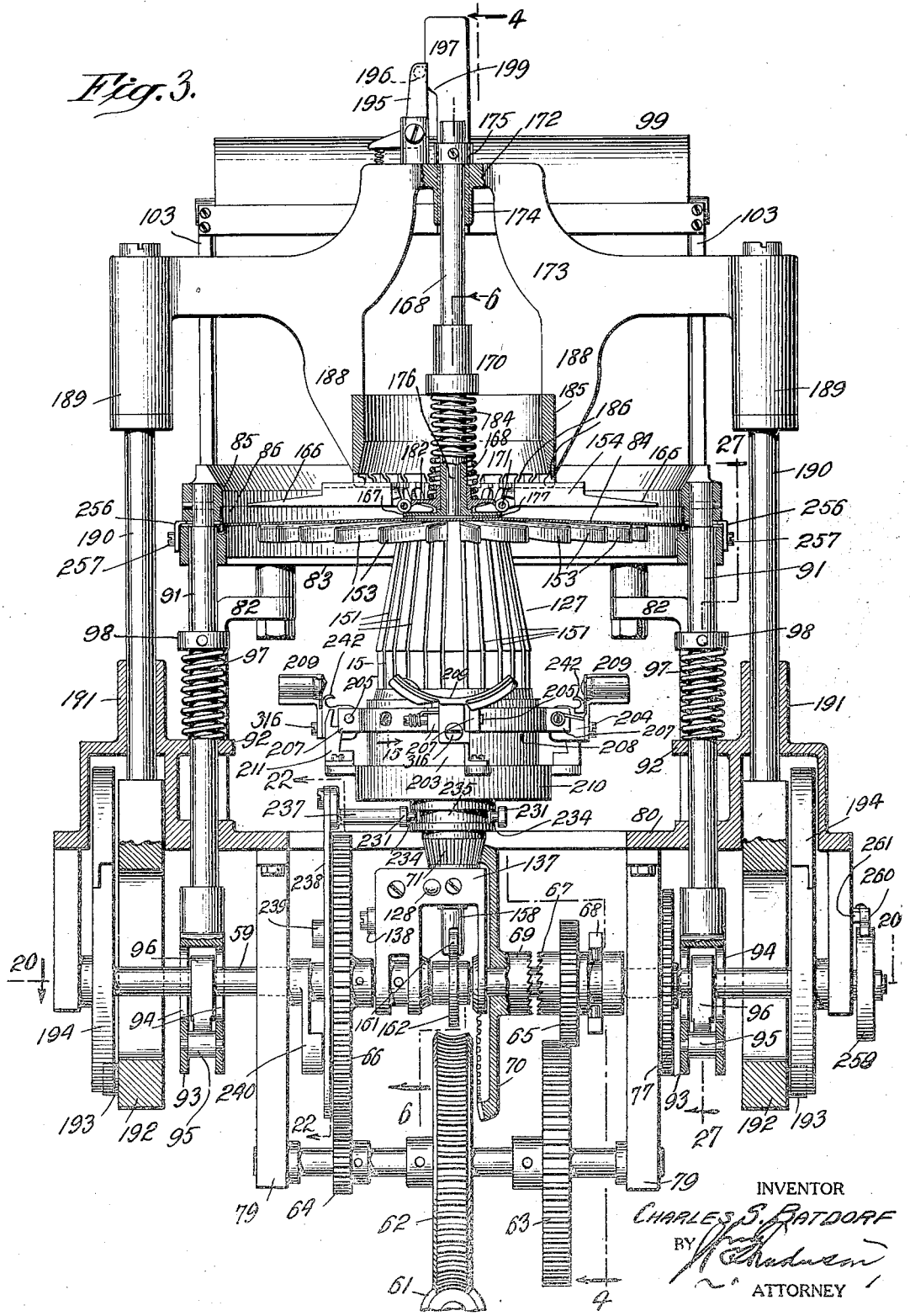
Figure 16:
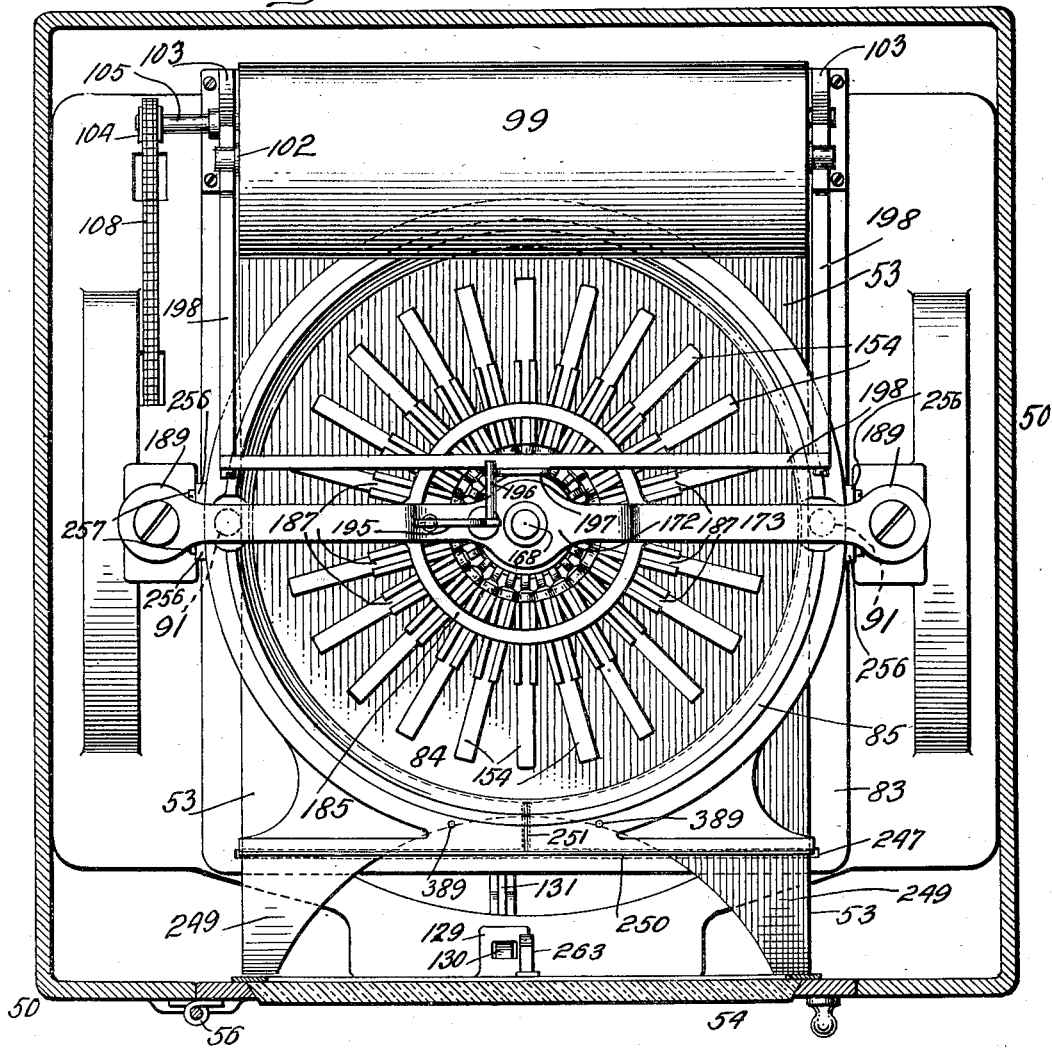
Figure 17:
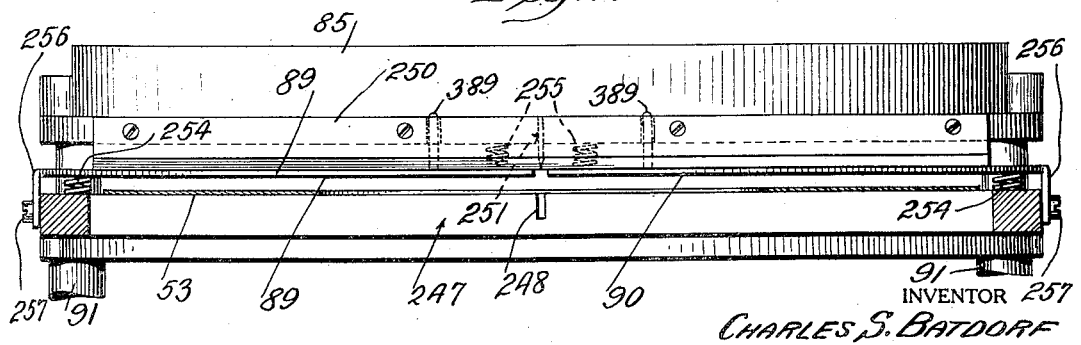
Figure 34:
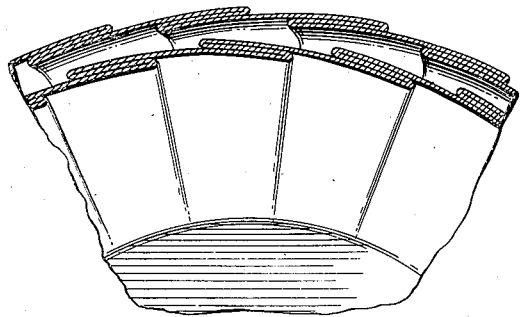
Figure 35:
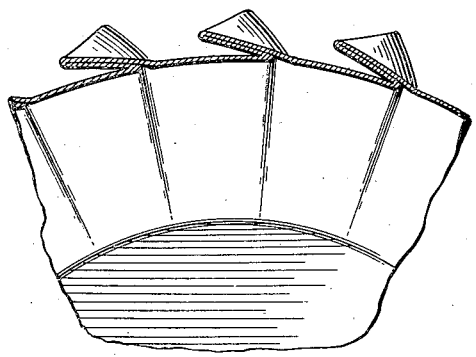
Figure 36:
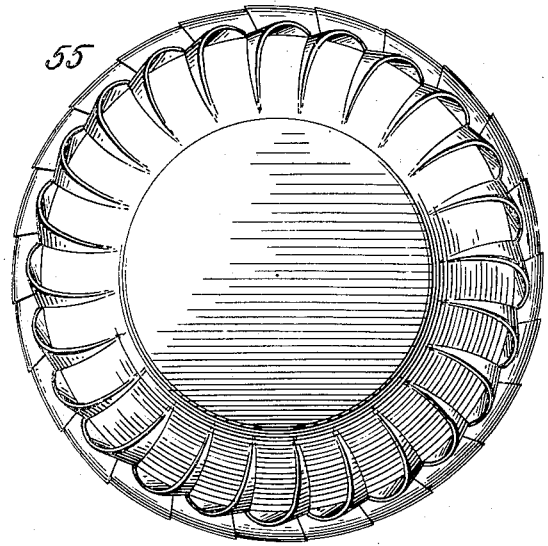
Figure 37:
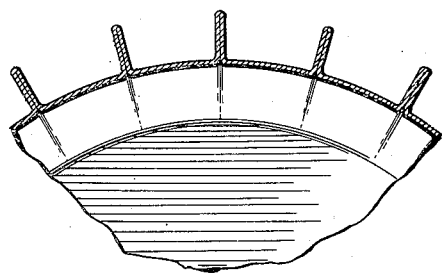
Figure 38:
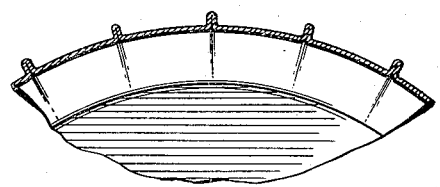

Fig. 3 is a vertical transverse section through the machine, taken on the dotted line 3—3 of Fig. 4 and illustrating the mechanism in a partly operated position preparatory to a disk of paper or cup-blank being pressed downwardly and fluted upon the forming-head, shown as in the form approximately of a truncated cone and in central vertical position below the disk of paper, said head having moved upwardly from the inclined position shown in Fig. 2 to central vertical position below said disk or blank, and the radial fluting blades carried by said head being shown as spread out below said disk or blank;

Fig. 4 is a vertical longitudinal section through the machine, taken on the dotted line 4—4 of Fig. 3, and corresponding in the position of its parts with Fig. 3;

Fig. 5 is a central vertical longitudinal section, partly broken away, through the machine, illustrating the working parts at rest, the forming-head as having carried a finished cup to delivery position and the door latching mechanism as having been released; Fig. 5 corresponds, in the position of the parts of the machine, with Fig. 2;

Fig. 6 is a vertical longitudinal section through a portion of the machine, taken on the dotted line 6—6 of Fig. 3 and illustrating one stage in the operation of transforming the paper disk into the finished cup, the fluting blades and radial creasing arms being illustrated as turning downwardly from their position shown in Figs. 3 and 4 to flute the disk, said arms closing the disk around the outer edges of and between said blades to form the flutes; as said arms and blades fold downwardly toward the forming-head the fluting blades retire into vertical slots or recesses in said head and the arms firmly press the cup-blank, then in the form of a truncated fluted cone, firmly against the sides of said head preparatory to certain finishing tools, shown idle in Fig. 6, coming into action to transform the fluted cup-blank into a finished cup;

Fig. 7 is a substantially corresponding view with Fig. 6, but on a slightly different section and illustrating a further stage in the operation of forming the cup, the radial creasing arms being shown in their final lower position pressing the material of the cup-blank firmly against the sides of the forming-head and the finishing tools being shown as having been moved upwardly from their position shown in Fig. 6, against the lower portions of the partly finished cup and in the process of rotating around the same for the purpose of ironing down the flutes of the paper cup and forming a beading around the edge of the same, it being noted that the cam at the lower end of Fig. 6 has rotated from the position therein shown to that represented in Fig. 7;

Fig. 8 is a vertical section through a portion of the machine and illustrates, on an enlarged scale, the position of the fluted cup-blank on the forming-head after the creasing arms have turned downwardly to their final lower position and the hinged ironing and bead forming members have turned upwardly against the depending edge portions of what may be called the partly formed cup;

Fig. 9 is a vertical section through a portion of the machine taken on the dotted line 9—9 of Fig. 11, and is presented to illustrate an initial position of the cup-blank after the same has been pressed downwardly upon the forming head, and more particularly the initial position of a rotary annular band which is especially shaped in its upper outer portions to curl or bead outwardly the edges around the mouth of the cup-blank, and also a rotary lip which presses against the cup-blank above the lower edge of the same and in rotating against the blank compacts or deadens the paper along the line of its travel preparatory to the unfinished edge of the cup being curled or rolled into a beading by the said annular band and other features of the mechanism;

Fig. 10 is a vertical section through a fragmentary portion of the machine taken on the dotted line 10—10 of Fig. 11, the sections of Figs. 9 and 10 illustrating successive stages in the formation of the edge portion of the cup; the annular band referred to in the description of Fig. 9, is shown in Fig. 10 as having moved upwardly to its upper position against the lower edge of the partly formed cup;

Fig. 11 is a horizontal section through the machine taken on the dotted line 11—11 of Fig. 7, Fig. 11 being on a larger scale than Fig. 7 and illustrating the parts of the machine on their final operation of completing a cup;

Fig. 12 is a bottom view, partly in section on the line 12—12 of Fig. 13, of one of the hinged segmental tools which engage the partly formed cup after the paper disk has been fluted downwardly to final position against the forming-head and which tool comprises four functional features, one being a broad flat concave surface for ironing down the flutes of the paper disk near the mouth of the cup, turning said flutes into plaits, another being a creasing lip shown at the right hand edge of Fig. 12 and which is also represented in Fig. 9 for engaging and rotating against the folds of the paper for the purpose of deadening the same along a definite line, a third feature being shown at the upper middle portion of Fig. 12 and being a curler or bead forming device shown in operation in Fig. 7 and on a larger scale in Fig. 8, and the fourth feature being at the lower left hand end of Fig. 12 and constituting a presser-foot which rides over the beading formed out of the edges of the paper for the cup and serves to counteract any tendency of the paper to uncurl or spring outwardly;

Fig. 13 is an elevation of the tool shown in Fig. 12 and taken from the inner or concave side thereof, and illustrating the four functional features defined in the description of Fig. 12;

Fig. 14 is a vertical transverse section through the same taken on the dotted line 14—14 of Fig. 12, Fig. 14 illustrating the tool in its inoperative position and indicating that the member for curling over the edges of the paper to aid in forming the beading is in one part with the shank or block carrying the remaining portions of the tool;

Fig. 15 is a vertical section through a detailed portion of the machine taken on the dotted line 15—15 of Fig. 3; Fig. 15 presents a different view of the same rotary annular band shown in and referred to in the description of Figs. 9 and 10;

Fig. 16 is a horizontal transverse section through the machine taken on the dotted line 16—16 of Fig. 2;

Fig. 17 is a front elevation, partly broken away and partly in section on the dotted line 17—17 of Fig. 5, of an upper portion of the machine, such portion comprising the cutter for cutting the disks or blanks from the strip of paper for the formation of the individual cups, a bed plate over which the strip is caused to intermittently travel and which has a large central opening for the downward passage of said disks and a stripper for cooperation with said cutter and bed plate;

Fig. 18 is a horizontal section through the machine taken on the dotted line 18—18 of Fig. 1 with the forming-head shown in vertical or cup-forming position, in which position said head is also illustrated in Figs. 3 and 4, as distinguished from the cup-delivery position in which said head or former is shown in Figs. 2 and 15;

Fig. 19 is a fragmentary view, partly broken away and partly in section and taken in front elevation, of an upper portion of the machine and particularly a vertically slidable yoke or frame, which is also illustrated in Fig. 3, said yoke or frame being in Fig. 19 shown as latched in an upper position, while in Fig. 3 said yoke or frame is shown as having been released from said latch and descended to a lower position;

Fig. 20 is a horizontal section through the machine taken on the dotted line 20—20 of Fig. 3, and illustrating more particularly the main shafts and cam and gear mechanisms for actuating the several parts of the machine;

Fig. 21 is a vertical section through the same taken on the dotted line 21—21 of Fig. 20; Fig. 21 shows one of the two cams employed for vertically moving the yoke or frame referred to in the description of Fig. 19;

Fig. 22 is a vertical section through a portion of the actuating mechanism of the machine taken on the dotted line 22—22 of Fig. 3; this mechanism has particularly to do with the positioning and retraction of the finishing tools for completing the mouth portion of the cup;

Fig. 23 is a vertical section through a portion of the actuating mechanism of the machine taken on the dotted line 23—23 of Fig. 20; Fig. 23 illustrates the means for turning the forming-head or former into vertical cup-forming position and locking the same in that position;

Fig. 24 illustrates the same mechanism shown in Fig. 23 but with the parts in a different relation to one another; Fig. 24 shows the position of the parts when the forming-head or former is unlocked and inclined forwardly to its cup-delivery position;

Fig. 25 is a vertical section through a portion of the actuating mechanism of the machine taken on the dotted line 25—25 of Fig. 20 and illustrating the means for effecting an intermittent feed of the paper strip to the cutter which cuts out therefrom the disks or cup-blanks;

Fig. 26 is a vertical section through a portion of the same taken on the dotted line 26—26 of Fig. 25;

Fig. 27 is a vertical section, partly in side elevation, of that portion of the machine having to do with the circular cutter for cutting the disks or blanks for the individual cups and illustrates the means for effecting the vertical movement of said cutter toward and from the paper strip;

Fig. 28 is a horizontal section through the same taken on the dotted line 28—28 of Fig. 27, Fig. 28 indicating the strip of paper from which a disk or circular blank for a cup has been cut;

Fig. 29 is a detailed vertical section of a portion of the mechanism shown in Fig. 28, taken on the dotted line 29—29 of Fig. 28; Fig. 29 shows the spring mounting for adjacent portions of the stripper band;

Fig. 30 is a side elevation of the paper drinking cup or container formed on the machine made the subject of this application;

Fig. 31 is a top view of the same;

Fig. 32 is a horizontal section through the same taken on the dotted line 32—32 of Fig. 30;

Fig. 33 is a vertical section, on a larger scale, of a portion of the cup taken on the dotted line 33—33 of Fig. 31;

Fig. 34 is a horizontal section through a portion of the upper part of the cup, taken on the dotted line 34—34 of Fig. 33;

Fig. 35 is a corresponding section through a portion of the cup taken on the dotted line 35—35 of Fig. 33;

Fig. 36 is a bottom view of the cup;

Fig. 37 is a horizontal section through a portion of the same taken on the dotted line 37—37 of Fig. 33;

Fig. 38 is a horizontal section through a portion of the cup taken on the dotted line 38—38 of Fig. 33, and Fig. 39 is a diagrammatic view illustrating the electric circuits whereby the mechanism of the machine is caused to come to rest after each cycle of the operation thereof in making a cup and placing the same in cup-delivery position, and whereby on the removal of the cup and the closing of the door of the cabinet a circuit is completed to again set the mechanism in motion for another cycle of operation and the making of another cup and its movement to cup-delivery position.

In the preferred embodiment of the invention now to be described, the web of paper is in dry, unmoistened condition, and the entire method and operation of forming a novel and complete, self-suspending cup with an annular bead at its mouth, is carried out while the paper is in the same condition, the entire method and operation being preferably carried out in a forming zone having an axis corresponding substantially with the central point or axis of the disk of material as and when the disk is cut in the machine and delivered to the forming means located in that zone.

In the drawings 50 designates a convenient form of cabinet enclosing the mechanism of the machine. The cabinet 50 may be of any appropriate type, and, as shown, has a hinged hood portion 51 to be opened as occasion may require, a basket portion 52 to catch paper clippings resulting from the cutting of disk or cup blanks from the intermittently traveling strip of paper 53 and a hinged door 54 which will be opened to permit the removal of a finished cup 55 (Figs. 1 and 5) and closed to complete an electric circuit for setting the machine in operation to make another cup and position the same at the door 54, in the manner hereinafter described. The door 54 will be provided with a closing-spring 56 of any suitable type for positively closing the door after each opening thereof to permit the withdrawal of a cup 55, and special latch mechanism is provided within the cabinet for securing the door 54 in closed position, such mechanism and the manner of its release to permit the door to be opened being hereinafter described.

The mechanism of the machine may be driven from a motor 57, a shaft 58 geared thereto, a main driving shaft 59 carrying various cams and gears appropriate for certain features of the mechanism and an auxiliary shaft 60 (Fig. 20) carrying cams and gears for other features of the operative mechanism. The motor shaft has a worm 61 geared to a worm wheel 62 on the shaft 58 and therefrom imparts motion to said shaft 58. The shaft 58 has secured on it a gear wheel 63 and opinion wheel 64, the gear wheel 63 being in mesh with a gear wheel 65 normally free on the shaft 59, and the pinion wheel 64 being in mesh with a large gear wheel 66 fast on the shaft 59. The gear wheel 66 and shaft 59 are in constant rotation while the machine is in operation. The gear wheel 65 rotates idly a portion of the time on the shaft 59, and said gear wheel 65 is in one part with a slidable clutch sleeve 67, which is movable by means of a shipper lever 68 to engage and be disengaged from a clutch member 69 on a beveled gear wheel 70 which is free on the shaft 59, by reason of the well known tongue and grove connection between the wheel 70 and shaft 59, but is compelled to rotate thereon when the clutch members 67, 69 are in engagement with each other, the driving power then being from the gear wheels 63, 65. The beveled gear wheel 70 is in constant mesh with a beveled pinion wheel 71 which is only in motion during the final stages of the operation of finishing a cup. The shipper lever 68 is pivoted to a yoke 72 (Figs. 4 and 20) which is free on the shaft 60 and is timed in its movements to engage and disengage the clutch members 67, 69 by a cam 73 on the shaft 60 and spring 74 acting to turn the lever 68 in a direction to engage said clutch members and to press a stud 75 thereon against the face of the cam 73. The cam 73 has cut-out section 76 (Fig. 4), and when this portion of the cam reaches the stud 75 said stud is, by means of the spring 74, driven into the same and the lever 68 then slides the clutch member 67 into engagement with the clutch member 69, this engagement continuing until the section 76 leaves the stud 75 and the solid face of the cam 73 rides against the stud 75 and reverses the position of the lever 68.

The shafts 59, 60 are geared together by gear wheels 77, 78 (Fig. 20) and hence have simultaneous rotation. The shafts 58, 59 are mounted in hangers 79 (Fig. 3) secured at their upper ends to a metal skeleton platform 80, and the shaft 60 is mounted in hangers 81 secured to said platform.

Suitably spaced above the platform 80 and fixedly positioned by inturned upper ends of four standards 82, is a bed frame 83 having a circular open center over which the paper 53 for use in making cups is caused to intermittently travel and down through which open center the disks cut from the paper are caused to move preparatory to their being converted into cups. One of said paper disks, which I number 84, is shown in initial position over the open center of the frame 83 in Figs. 3 and 4, and the method of converting said disk into a finished cup is represented in Figs. 6 and 7, the details of said method being illustrated in Figs. 8, 9, 10 and 11. The paper disk or blank 84 is shown in plan view in Fig. 16. The standards 82 are secured at their lower ends upon the platform 80 (Fig. 18).

The bed frame 83 is stationary at all times and directly above this frame is a vertically movable frame 85 carrying a circular band cutter 86 having a saw tooth lower or cutting edge, as shown in Figs. 5, 6 and 7.

Between the frames 83, 85 is a stripper ring 87 which first descends upon the paper to hold the same in rigid position against the frame 83 preparatory to the descent of the cutter 86 against the paper to cut the disk blank therefrom and then remains on the remnant of the paper surrounding the blank during the ascent of said cutter. The details of the frames 83, 85, cutter 86 and stripper 87 will be described hereinafter. The stripper 87 will preferably be in three sections 88, 89, 90, as shown in Fig. 28, the section 88 defining a half circle and the sections 89, 90 each a quarter circle.

The cutter frame 85 is secured upon the upper ends of two opposite vertical side rods 91, 91 (Fig. 3) which extend downwardly through guiding apertures in brackets 92 constituting portions of the platform 80 and through guiding apertures in said platform and at their lower ends carry forks 93 (Figs. 3, 20 and 27), which are vertically slotted, as at 94, and carry at their lower ends the rollers 95. The shaft 59 passes through the slots 94 and on said shaft, within the forks 93, are cams 96 which act against the rollers 95 to depress the rods 91 and cutter frame 85 in opposition to the force of the springs 97 on said rods and which act to elevate said rods and frame when permitted so to do by the cams 96. The springs 97 keep the rollers 95 against the cams 96. The cams 96 depress the rods 91 and cutter frame 85 for effecting the cutting of a disk-blank 84 from the paper by means of the cutter 86 and thereafter the springs 97 elevate said rods 91 and frame 85, leaving a clear space for an additional portion of the paper to be fed over the stationary frame 83. The rods 91 extend through vertical apertures in and are guided by the frame 83, as shown in Fig. 3. The springs 97 are confined between the brackets 92 and collars 98 secured on the rods 91.

The strip of paper 53 from which the disk cup-blanks are cut and which is caused to travel across the bed frame 83 and below the stripper 87 and cutter frame 85, is fed from a reel or roll 99 and between a friction roller 100 and a small roller 101 which is spring-pressed against the paper and presses the same against the roller 100, as shown in Figs. 4 and 5. The roll 99 is freely mounted on a rod or axle 102 supported in standards 103, in which the shaft ends of the roller 100 are journalled. Power is applied to the roller 100 for effecting the travel of the strip of paper 53 by mechanism intermediate the auxiliary shaft 60 and one end of said roller and comprising a sprocket wheel 104 on the shaft end 105 of said roller (Figs. 16, 25), a larger sprocket wheel 106 having a tubular hub 107 mounted on and normally free of the shaft 60, a sprocket chain 108 connecting said sprocket wheels, a ratchet wheel 109 whose tubular hub 110 is on and normally free of the shaft 60 and has a tongue and recess connection 111 (Figs. 25, 26) with said hub 107 and an arm 112 whose hub 113 is pinned on the shaft 60 and which arm carries a pawl 114 which is normally spring-pressed against the teeth of said ratchet. When the shaft 60 is in rotation its movement is imparted to the arm 112 and pawl 114 and the pawl 114 while in engagement with the ratchet wheel 109 will rotate said wheel and therewith the hubs 110, 107 and sprocket wheel 106, with the result that the chain 108 will impart motion to the roller 100 and the strip of paper 53 will be fed forwardly just so long as the pawl 114 remains in engagement with the ratchet wheel 109. The paper 53 must be fed intermittently and hence I provide means for maintaining the pawl 114 free of the ratchet 109 during predetermined periods, during which periods the arm 112 continues its rotation and the ratchet wheel 109, hubs 110, 111, wheel 106, chain 108 and roller 100 remain at rest. The means shown for holding the pawl 114 free of the ratchet 109 during predetermined intervals without interfering with the rotation of the shaft 60, comprise a round arm 115 projecting from the side of the pawl 114 and a stationary cam 116 having a recessed section 117 and a periphery which is otherwise concentric with the shaft 60. The cam 116 is free on the hub 110 and held by an arm 118 depending from a rod 119 secured to a hanger 81. When during the rotation of the shaft 60, the arm 115 is free of the cam 116 and traveling along the recess 117 of said cam, as in Fig. 26, the pawl 114 will impart rotary motion to the ratchet 109 and parts connected therewith and the paper 53 will be fed forwardly; when the arm 115 reaches the end of the recess 117 the rounded corner 121 of the periphery of the cam 116 will deflect the arm 115 outwardly and withdraw the pawl 114 from the ratchet 109 and thereafter the arm 115 will ride on the concentric periphery of the cam 116 to maintain the pawl 114 free of the ratchet 109, this continuing until the arm 115 again reaches the recess 117 of the cam 116 and at that time the pawl 114 will again spring into engagement with said ratchet.

I preferably form the cam 116 of two facing segmental plates 122, 123 having registering segmental slots 124, 125, respectively, and secure these plates together and to the arm 118 by means of a set screw 126 which extends through the slots 124, 125, as shown in Figs. 25 and 26. In this construction of the cam 116, the plates 122, 123 may be adjusted with relation to each other for varying the length of the recess 117 and consequently for varying the periods during which the pawl 114 will engage and rotate the ratchet 109 to effect the feeding of the paper 53. The paper 53 is fed in timed relation to the operation of the cutter 86 and cup-forming mechanism, as will be explained hereinafter.

At a certain period in the operation of the machine, a head or former 127 is positioned vertically and centrally of the circular opening in the stationary bed frame 83 and centrally below the paper disk 84 which is to be converted into a cup. The head or former 127 is approximately of the outline of the interior of the cup to be produced in inverted position or bottom end up. The head or former 127 has no rotary motion and is mounted to have an oscillatory motion from its inclined cup-delivery position shown in Figs. 2 and 5, to its vertical cup-forming position shown in Figs. 3, 4, 6, 7, 8, 11 and 13, and then back to its said cup-delivery position.

Upon arrival of the head or former 127 to its cup-delivery position the entire mechanism of the machine comes to rest and will not again start into operation until the door 54 has been opened, the finished cup 55 removed from the head or former and the door 54 is again closed, the closing of the door 54 completing, as hereinafter explained, an electric circuit which will compel the mechanism to perform another cycle of operation during which another cup will be formed and carried by the head or former 127 to the cup-delivery position shown in Fig. 1, the circuit being broken by the cup on its arrival in that position and remaining broken until the door 54 is opened and the cup removed from the head or former 127 and said door is closed to again complete the circuit. The door 54 is locked in closed position by mechanism located within the cabinet 50, and this mechanism is operated to release the door 54 only when the head or former 127 is reaching its cup-delivery position, an arm 128, indirectly connected with said head or former, then acting against and to free said locking mechanism from the door 54 (Fig. 5). The door locking mechanism may be of varied type, and at present I show the same as comprising a keeper 129 on the door, a slidable latch bolt 130 to engage the same and a pivoted lever 131 which is normally acted upon by a spring 132 to move the bolt 130 into said keeper. A pivoted lever 133 has one end below the inner end of the lever 131 and its other end in the path of the aforesaid arm 128. When the head or former 127 is reaching its cup-delivery position, the arm 128 presses downwardly on the inner end of the lever 133 and causes the other end of said lever to move the inner end of the lever 131 upwardly in opposition to the spring 132 to effect the withdrawal of the bolt 130 from the keeper 129. The bolt 130 will remain in its retracted position so long as the head or former 127 is in its cup-delivery position and will only be free to return to its operative position when the mechanism of the machine is again set in motion by the closing of the door 54 and the head or former 127 is moving to its vertical cup forming position.

The head or former 127 is hollow and secured upon the upper end of a tubular rod 134, whose upper threaded end passes through and shoulders against a rigid plate portion 135 of the head or former and receives a nut 136 which is screwed down against said plate portion (Figs. 6 and 8). The lower end of the tubular rod 134 is rigidly fastened within a carrier bracket 137 (Fig. 3) which is forked downwardly and formed with bearing apertures through which the shaft 59 passes, whereby said rod 134 and its bracket 137 becomes hinged on said shaft and are permitted to oscillate thereon and carry the head or former 127 to its two positions hereinbefore described. The bracket 137 carries the aforesaid arm 128.

The means for imparting oscillatory movements to the tubular rod 134, head or former 127 and associated parts, comprise a lever arm 138 pivotally secured at its forward end to one side of the bracket 137 (Figs. 3, 6, 7, 20, 23, 24) and being slotted at its rear end, as at 139, and a rim cam 140 secured on the shaft 60 and engaging a roller 141 secured on the side of said lever arm 138. The shaft 60 passes through the slot 139 in the lever arm 138 and serves to support the rear end of the arm 138 during its forward and rearward movements permitted by the slot 139 and effected by the cam 140. In Fig. 23 the bracket 137, arm 138 and cam 140 are shown in the position they occupy when said parts have been actuated to turn the tubular rod 134 and head or former 127 to their vertical or cup-forming position, and in Fig. 24 the bracket 137, arm 138 and cam 140 are shown in the position they occupy when said parts have been actuated to turn the tubular rod 134 and head or former 127 to their forwardly inclined or cup-delivery position.

When the tubular rod 134 and head or former 127 are in their vertical or cup-forming position said parts should be firmly locked in that position during the formation of a cup on said head or former, and the means I provide for thus locking said parts comprise an arm 142 rigidly secured to the bracket 137 and having a V-recess 143 in its rear end (Figs. 6, 7, 20, 23, 24), a dog arm 144 pivotally secured at its upper end to a hanger 145 and having at its lower portion a V-shaped detent 146 to interlock with the aforesaid recess 143 and a side roller 147, and a segmental cam 148 secured on the shaft 60 and having a concentric peripheral portion to ride against the roller 147 and lock the detent 146 in said recess 143, this serving to lock the bracket 137 vertically during a period when a concentric portion of the cam 140 is riding against the roller 141 on the lever arm 138 (Fig. 23). When the cam 148 leaves the roller 147 a spring 149 retracts the dog arm 144 from engagement with the locking arm 142, and then the lever arm 138 and cam 140 will turn the bracket 137 forwardly to the position shown in Fig. 24. The cam 140 at its enlarged end, being the left hand end looking at Fig. 23, rides freely against the roller 141 without acting on the lever arm 138 when the bracket 137, tubular rod 134 and head or former 127 are vertical, and the opposite end of said cam rides against the roller 141 while said bracket, rod and head or former are in their forwardly inclined position (Fig. 24), while the elongated sides of said cam 140 acting against the roller 141 operate to turn the rod 134 and head or former 127 to their inclined cup-delivery position and back to their vertical cup-forming position.

The hollow head or former 127 is of general truncated cone outline except at its lower end where said head or former has plain cylindrical walls 150. The forming head 127 has a series of closely arranged corresponding elongated radial slots 151 (Fig. 11) which extend from the outer end of the head to a solid portion 152 at the inner end of the head, and within these slots are corresponding pivoted flat elongated blades 153 whose outer edges are of dull knife edge formation (Fig. 11). The blades 153 are adapted to lie within the slots 151, as shown in Figs. 7, 11 and 18, or be spread outwardly therefrom to the substantially horizontal or canopy position in which said blades are shown in Figs. 3 and 4. In Fig. 6 I show the blades 153 as closing downwardly from their position shown in Figs. 3 and 4 toward the head 127 and on their movement to finally enter and become concealed within the slots 151. The blades 153 are fluting blades and the paper disk or blank 84 is creased upon their outer edges and opposite side faces by the closing down of a corresponding set of creasing blades 154 which are over the blank 84 and on planes between the planes of the blades 153 and fold the material of the blank upon and against the faces of the blades 153 while both sets of blades are closing down against the forming head 127, said blades 153 finally retiring into the slots 151 of said head and leaving the blades 154 in position binding the paper against said head, as shown in Figs. 7, 8, 9 and 10.

I will first describe the mounting and devices for operating the fluting blades 153 and thereafter consider the creasing blades 154 and the devices for operating them. The blades 153 are normally held within the slots 151 of the head 127, and the blades 154 are normally held in their spread-out position shown in Figs. 3, 4, 5 and 16.

The blades 153 are all alike and their outline is clearly shown in Fig. 6. Each blade 153 is pivotally mounted within the upper end of the head 127 and in an individual slot 151, and each blade 153 is formed in its upper or shank end with a tapered recess 155, the recesses 155 of the several blades forming a circular row of corresponding recesses. All the recesses 155 receive a circular flange 156 formed on a head 157 positioned within the outer end of the head 127, and which head 157 is radially recessed above the flange 156 along lines extending in the planes of the swinging movements of the blades 153, as shown in Fig. 6 and Fig. 7, to allow freedom of movement for the outer ends of the blades 153 during outward spreading of said blades and their return to closed position within the slots 151. The flanged head 157 is secured on the upper end of a rod 158, which extends within and longitudinally through the aforesaid tubular rod 134 carrying the forming head 127. The rod 158 has thereon a coiled spring 159 confined between a collar 160 on the rod and the nut 136 through which the rod passes. The lower end of the rod 158 carries a roller 161 which is engaged by a cam 162 on the main shaft 59. The spring 159 presses the rod 158 downwardly and retains the roller 161 against the cam 162. The cam 162 when its outer peripheral portion engages and is riding against the roller 161, holds the rod 158 pressed upwardly in opposition to the action of the spring 159, and the upward movement of the rod 158 is utilized to move the head 157 upwardly and through its flange 156, acting against the upper walls of the recesses 155, effect the downward folding of the blades 153. The cam 162 has a cut out section 163, and when this section of the cam is passing the roller 161, the spring 159 presses the rod 158 downwardly into said cut out section and the effect of this is that the head 157 moves downwardly and its flange 156, acting against the lower walls of the recesses 156, turns the blades 153 outwardly to their spread-out position shown in Figs. 3 and 4. The cam 162 keeps the blades 153 closed down into the head 127 except when said head is vertical and a paper disk is to be pressed down upon said blades and against the sides of said head by the creasing blades or arms 154, and after this stage of the operation has taken place the cam 162 retains the blades 153 in closed position until certain finishing tools, hereinafter described, have operated against the lower portions of the partly formed cup and until the head 127 has been moved to its inclined cup-delivery position and also until said head 127 has been returned to its vertical cup-forming position.

The rod 158 contains a vertically elongated slot 164 through which passes a transverse pin 165 (Figs. 6 and 8) which prevents the rod 158 from having any turning motion within the tubular rod 134.

The fluting blades or arms 153 are formed at their inner ends with small trunnions 253 (Fig. 6) which are seated within recesses 254 formed in the inner walls of the head 127, as shown in Fig. 7. said blades 153 thus being pivotally mounted or hinged within the upper end of the forming head 127.

The creasing blades or arms 154 normally stand in their spread-out or canopy position, as shown in Figs. 2 to 5 inclusive and Fig. 16, and these blades or arms, as hereinbefore briefly mentioned, fold downwardly against the paper disk 84 and crease the same between the fluting blades 153, as shown in Fig. 6, and finally bind the fluted partly formed cup against the sides of the forming head 127, as shown in Figs. 7 to 11 inclusive. The blades or arms 154 are of considerable width, as compared with the thin knife edge blades 153, as will be seen by comparison of the thicknesses of said blades or arms, as shown in Fig. 11. The creasing blades or arms 154 are tapered downwardly and outwardly at the upper edges of their outer portions, as shown in Figs. 3, 4 and 5, leaving reasonably thin fingers 166 at the outer ends of said blades or arms 154. The blades or arms 154 are radially disposed and they are pivotally mounted on a wire ring 171 held on the edges of a disk 167 (Figs. 6 and 7) which is formed on the lower end of a tubular rod 168 on which is fastened by a set-screw 169 (Fig. 6) a tubular shoulder 170, whence the rod 168 extends upwardly as a plain cylindrical rod through the top cross-bar 172 of a transverse yoke or frame 173 crossing the machine at the upper portion thereof, as shown in Fig. 3. The cross-bar 172 is formed with a bearing 174 for the upper portion of the rod 168, and on said rod 168 above the cross-bar 172 is secured a retaining collar 175. Within the tubular portion of the rod 168 is a vertical rod 176 carrying on its lower end a disk presser-foot 177, this foot being adapted to press the paper disk downwardly upon the upper end of the forming head 127. The rod 176 is adapted to have vertical movement within the rod 168 and is guided in such movement by a pin 178 secured to said rod 176 and extending laterally through a vertical guiding slot 179 formed in the tubular rod 168. A spring 180 confined within the tubular rod 168 presses upon the upper end of the rod 176 and normally acts to drive the presser-foot 177 downwardly with a spring pressure.

The creasing blades or arms 154 have at their inner ends inclined fingers 181 whose outer ends are rounded, as shown in Fig. 6, and confined below the annular concave surface of a cam disk 182, which is vertically slidable on the tubular rod 168, said cam disk 182 having a hub 183 on said rod 168, as shown in Fig. 6. Upon the tubular rod 168 is a coiled spring 184 whose lower end presses against the cam disk 182 and whose upper end is confined against the lower end of the shoulder afforded by the sleeve 170. The action of the spring 184 is to press the cam disk 182 downwardly against the fingers 181 of the blades or arms 154 and thereby force said fingers to turn downwardly against the disk-plate 167 and move the main body portions of said blades or arms 154 into their spread-out position, shown in Fig. 5.

The means for folding all of the blades or arms 154 downwardly in opposition to the force of the spring 184 comprise a cylindrical frame 185 which is concentric with the tubular rod 168 and has at its lower edge a series of rounded arms or projections 186 in engagement with the upper surfaces of the blades or arms 154 and confined between edge-flanges 187 formed on opposite edges of the upper end portions of said blades or arms 154. The rounded arms 186, when the frame 185 is depressed, ride against the upper portions of the blades or arms 154 and between the flanges 187 thereon and serve to fold said blades or arms 154 downwardly and to maintain the same in their closed down position until said blades or arms are released on the upward movement of said frame 185. When the frame 185 is depressed to close the blades or arms 154 downwardly, the fingers 181 on said blades or arms press upwardly against the cam disk 182 and compress the spring 184, with the result that the spring 184, reacting against the cam disk 182, firmly presses the blades or arms 154 against the projections or arms 186 on the frame 185. In the absence of provision to the contrary, when the frame 185 starts to move upwardly, the spring 184 would immediately start to turn the blades or arms 154 outwardly, and this would result in said blades or arms disturbing and possibly tearing the folds formed in the sides of the cup then on the forming head 127. I therefore provide, as hereinafter more fully described, that the frame 185 and rod 168 shall become interlocked when the frame 185 has reached its lowermost position, so that on the ascent of the frame 185 said rod 168 will move upwardly in unison with it until the blades or arms 154 have become withdrawn from the folds of the cup, at which period said frame and rod become disengaged from each other and the spring 184 is permitted to spread the blades or arms 154 outwardly.

The cylindrical frame 185 is in one part with the depending arms 188 of the yoke or frame 173, shown in front elevation in Fig. 3 and in top plan view in Fig. 16. The frame 173 extends transversely across the machine and at its outer ends is formed with vertical sleeves 189 which are secured upon the upper ends of vertically slidable rods 190, which rods extend downwardly through bearing sleeves 191 formed in a part of the supporting framing of the machine and carry on their lower ends slotted yokes 192 through which the shaft 59 freely passes and which yokes carry rollers 193 which are in operative engagement with cams 194 secured on the shaft 59 and one of which cams is shown in detail in Fig. 21. During the rotation of the shaft 59 the cams 194 act in proper timing on the rods 190 to draw the cross-head or frame 173 and cylindrical frame 185 downwardly to effect the closing down of the series of creasing blades or arms 154, this taking place after a disk 84 has been severed from the strip of paper 53, and the cams 194 retain the cross-frame or head 173 and cylindrical frame 185 in their depressed or lower position until certain finishing tools hereinafter described, have completed their operation against the lower fluted edge of the partly formed cup, as indicated in Figs. 7, 8, 9, 10 and 11.

The disk presser-foot 177 is normally above the path for the strip of paper 53, as shown in Fig. 5, but after the proper length of paper has been fed across the bed 83 and below the cutter 86 and the machine has started into operation, the said disk presser foot on the lowering of the cylindrical frame 185, binds the paper against the upper end of the head 127, said disk presser foot then taking the position shown in Figs. 3, 4, 6 and 7 and retaining its pressure against the paper and finally against the bottom of the partly formed cup until the finishing tools, hereinafter described, have completed their operation against the flutes at the mouth portion or lip of the cup.

During the downward movement of the yoke or frame 173, the pressure of the cylindrical frame 185 on the blades or arms 154 will cause the rod 168 to descend until the presser foot 177 is firmly against the paper and the bottom flange of said rod 168 is against said presser foot, as shown in Fig. 7. The descent of the rod 168 at this time results in the presser foot spring 180 becoming compressed, and this reacts to effect a firm pressure of the foot 177 against the paper and in the binding of the paper against the upper end of the forming-head 127.

The rod 168 on its descent will become arrested before the yoke or frame 173 reaches its lower position under the action of the cams 194, and hence said yoke or frame 173 will slide downwardly on the rod 168 after said rod has reached its lowermost position. During the downward movement of the yoke or frame 173 on the rod 168 after the rod has become arrested, a spring dog 195 carried by the yoke 173 will snap below the collar 175 on said rod 168, as shown in Fig. 19, thereby preventing the yoke or frame 173 from ascending independently of the rod 168. The dog 195 is provided on one side with a pin 196 which is spring pressed against the edge of a vertical arm 197 stationary with a frame 198 secured to the standards 103 supporting the reel or roll 99 of paper. During the downward movement of the yoke or frame 173, the pin 196 of the dog 195 performs no duty, simply following down along the edge of the arm 197 and finally springing below the collar 175. After the dog 195 has snapped below the collar 175 during the downward movement of the yoke or frame 173 beyond that of the rod 168, and the said yoke or frame 173 has started to ascend, the dog 195 by its engagement with the collar 175 will compel the rod 168 and its parts to travel upwardly in unison with said yoke or frame 173 until the pin 196 on the dog rides against the cam edge 199 on the arm 197, at which time the dog 195 will be forced outwardly from the collar 175 and the rod 168 will become disconnected from the yoke or frame 173. The purpose of having the yoke or frame 173 and rod 168 move upwardly in unison for a given distance, is to permit the blades or arms 154 to be drawn upwardly, without spreading, from between the folds at the mouth end of the then finished cup. After the yoke or frame 173 and rod 168 have ascended sufficiently to retract the blades or arms 154 from the folds of the finished cup, the dog 195 becomes released from the collar 175, and the spring 184 then operates to lower the rod 168 until the collar 175 strikes the cross-bar 172 of the yoke or frame 173 and also acts on the cam disk 182 to promptly turn the blades or arms 154 to their spread-out initial position.

When the yoke or frame 173 and rod 168 both reach their initial position, the presser-foot 177 will have attained its initial position free of the cup on the forming head 127.

Cup-finishing mechanism

After the disk-blank 84 has been folded downwardly on the forming-head 127 and fluted by the blades 153, 154, the cup has only been partly formed and requires finishing at and adjacent to its then lower edge, this being the mouth portion of the cup, by having the flutes thereat ironed down to form plaits and by having the edge portion of the cup formed into a beading which will lock the plaits together; prevent the folds of the cup from opening out when in use, improve the appearance of the cup and render the cup more durable and more suitable to drink from.

The finishing of the mouth portion of the cup is performed while the yoke or frame 173 is in its lowermost position, with the presser-foot 177 in operative position, and the fluted sides of the partly formed cup are held against the forming head 127 by the arms or blades 154, the blades 153 then having closed within the slots 151 of said head.

The cup-finishing mechanism is shown in initial idle position in Figs. 2 to 6 inclusive, in partly operative position in Figs. 8 and 9 and in operative position in Figs. 7, 10 and 11, and several of the details of said mechanism are shown in Figs. 12, 13, 14 and 15.

The cup-finishing mechanism comprises a vertical band 200 (Fig. 6) having a downwardly and outwardly tapered upper outer portion 201 and a concave annular base groove 202, a cup member 203 upon whose upper edge said band 200 is seated, four equally spaced apart blocks or shanks 204 pivotally secured, by pins 205, between pairs of arms 207 formed on the adjacent ends of the sections of a sectional band 208 (Figs. 3, 4 and 18) secured to the cup member 203, ironing-segments 209 rigidly secured to said blocks 204 and a vertically movable cup member 210 receiving the lower end of the cup member 203 and carrying standards 211 which have supporting shoulders 212 to be engaged by shoulders 213 on the blocks 204 when the cup-finishing mechanism is in inoperative position (Fig. 6) and upper ends 214 to lie below lateral extensions 215 of the base members 216 of the segments 209, as clearly shown in Fig. 11, when the cup-finishing mechanism is in operative position. The ironing segments 209 and blocks or shanks 204 carry certain specific tool features which will be described hereinafter.

The cup members 203 and 210 are connected together by screws 217 which extend freely through apertures in the bottom of the cup member 203 and are firmly connected with the cup member 210. The cup member 210 is permitted by the screws 217 to have vertical movement upwardly and downwardly on the cup member 203 without affecting said cup member, this being for the purpose of permitting the cup member 210 to move upwardly on the cup member 203 for turning the blocks or shanks 204 and segments 209 from their initial inoperative position shown in Fig. 6 to that shown in Fig. 8, in which I illustrate the cup member 210 as having moved upwardly on the cup member 203, and also for the purpose of allowing the cup member 210 to move downwardly from the cup member 203 for reversing the blocks or shanks 204 and segments 209 from their position shown in Fig. 8 to that shown in Fig. 6 after a cup has been finished. The screws 217 are also for the purpose of assuring the simultaneous rotation of both cup members and the tools carried thereby during the final operation of the machine in finishing a cup. The cup member 210 derives its rotary motion from a tubular shaft 218 having on its lower end the aforesaid beveled gear wheel 71 and which shaft 218 encloses a main portion of the tubular shaft 134, as shown in Figs. 6 and 8. The tubular shaft 218 is rotated from the beveled gear wheel 71 and beveled gear wheel 70 (Fig. 3) normally free on the shaft 59 and being set in motion when the clutch members 67, 69 are in engagement with each other. The cup member 210 has a central sleeve 219 which is mounted upon the shaft 218 and is vertically slidable thereon and is keyed thereto by a spline 220. The tubular shaft 218 is enabled to rotate the cup member 210 by reason of the spline 220. The cup member 203 has a central sleeve 221 which is loosely mounted upon the sleeve 219 of the cup member 210.

Within the body portion of the forming head 127 and below the plate portion 135 of said head is mounted, upon the shaft 218, a sleeve 222 which is fastened by a screw 223 to the shaft 218 (Fig. 8) and consequently rotates therewith. The sleeve 222 has, at its lower end, four radially extending pairs of arms 224, clearly shown in Fig. 11, and between these arms is pivotally mounted the locking arms 225 whose upper ends are pressed against in an outwardly direction by springs 226 and whose lower ends are approximately heart-shaped, as at 227, and have at their upper portions inwardly extending hooks 228. When the cup members 210, 203 are in their lower initial position, the lower ends of the lever arms 225 engage the upper edges of the sleeve 221 of the cup member 203 and prevent said cup member from being elevated at the time the cup member 210 is initially elevated from its lower position shown in Fig. 6, to turn the shanks or blocks 204 and segments 209 upwardly into operative position, and when the cup member 210 is thus elevated to the cup-member 203, without pushing the member 203 upwardly, the upper edge of the central sleeve 219 of said cup member rides against the heart-shaped lower ends 227 of the levers 225 and turns said levers, at their lower ends, outwardly in opposition to the stress of the springs 226 (this stage of the operation being shown in Fig. 8), and thereafter when the cup member 210, having ascended to the cup member 203 is moved upwardly to a further extent and to force the cup member 203 and annular band 200 upwardly, the annular shoulder 229 on the sleeve 221, due to the upward movement of the cup 203, becomes engaged by the lower hook portions 228 of the levers 225, in the manner shown in Fig. 7, Fig. 7 showing all of the parts in operative position with both cup members in an elevated position. The purpose of the levers 225 and annular shoulder 229 when in their position shown in Fig. 7, is to lock the cup member 203 in its upper position and permit the cup-member 210 to be moved downwardly for turning the blocks or shanks 204 and segments 209 outwardly from the position shown in Fig. 7 to that shown in Fig. 6 without the cup member 203 and annular band 200 at that time also descending. After the cup member 210 has been lowered sufficiently to turn the blocks or shanks 204 and segments 209 outwardly from the finished cup, the heads 230 on the screws 217 will, on the further downward movement of the cup member 210, pull the cup member 203 away from the hooks 228 of the levers 225, and at that time the cup members will be in the relation and position shown in Fig. 6 and the lower ends of the levers 225 will be above the upper edges of the sleeve 221 of the cup member 203. The cup member 210 thus moves upwardly for a certain distance independently of the cup member 203 and then the cup members 210 and 203 move upwardly together and slide the curling band 200 upwardly from its position shown in Fig. 9 to its position shown in Fig. 10, and after the cup has been finished, the cup member 210 is at first caused to descend alone, for turning the blocks or shanks 204 and segments 209 outwardly from the paper cup, and then the cup members 203 and 210 move downwardly together, this movement of the cup member 203 serving to lower the brim curling band 200 back to its lower position shown in Figs. 6 and 9, the finished paper cup then being in condition to be released by the upward movement of the circular frame 185 and rod 176 in unison and the withdrawal thereby of the arms 154 from the plaits formed on the lower portion of the finished cup by the specific tool features associated with the cup members 210, 203, and which will presently be particularly described. The curling band 200 during its upward movement from the position shown in Figs. 8 and 9 to that shown in Fig. 10, may owing to its engagement with the cup member 203 rotate with said cup member, but as the beading or curl on the edge of the cup blank becomes gradually formed and exerts pressure against said band 200, said band may slow up on its rotation and allow the cup-member 203 to rotate around it, this being permitted from the fact that the band 200 is connected at points with the cup-member 203 by screws 300 carried by the member 203 and freely entering an annular groove 301 in said band, as shown in Fig. 15.

The means for raising and lowering the cup members 210 and 203 comprise two arms 231 connected together at their rear ends by a sleeve 232 secured on a rock shaft 233 (Fig. 18) and at their front ends having trunnions 234 (Fig. 3) entered within an annular groove 235 formed in a lower collar integral with the cup member 210. The arms 231 are also connected together by a pin 236 (Figs. 5, 6, 7) which aids in rendering the two arms rigid and securing simultaneous motion therein. One of the arms 231 is connected at its front end by an arm 237 (Fig. 3) to the forward end of an oscillatory lever 331 secured at its rear end to said rock shaft 233 (Fig. 22) and at its forward end being pivotally secured to the upper end of a downwardly extending bar 238 whose upper end is shown in Fig. 5 and which bar is shown by dotted lines in Fig. 7, and by full lines in Figs. 3 and 22. The bar 238 carries a roller 239 which is engaged by a cam 240 secured on the shaft 59. A slot 241 in the lower end of the bar 238 permits said bar to have vertical movement, and such movement is imparted to the bar 238 from the cam 240 and from said bar 238 oscillatory movement is imparted to the lever 331, rock-shaft 233 and bars 231, whence motion is transmitted through the trunnions 234 to the lower cup member 210 and from that cup member to the cup member 203 and annular band 200.

The specific tools for finishing the lower end or mouth portion of the fluted partly formed cup held on the forming head 127, comprise the annular bead forming band 200, the curling-lip 242 formed on each of the blocks or shanks 204 (Figs. 12, 13, 14) for cooperation with said band 200, the creasing or paper-deadening lip 243 formed on the lower edge of one end of each segment 209, the foot 244 on the lower edge of the other end of each segment 209 and the broad convex ironing face of each segment. These specific tools are brought into cooperative relation and operative position by the upward movement of the cup members 210, 203 hereinbefore referred to, the first stage of movement of the cup 210 causing the blocks or shanks 204 and segments 209 to turn upwardly and inwardly to the position shown in Figs. 8 and 9, and the following upward movement of the cup-members 210 and 203 together resulting in the upward movement of the segments 209 and blocks or shanks 204 and also in the upward movement of the annular band 200, said parts finally reaching the position shown in Fig. 7. The cup-members 210, 203 are in rapid rotation before they move upwardly at all, and hence the segments 209 and their cooperating parts are in rotation when turned upwardly against the partly formed cup. The upward movement of the cup member 203 and annular band 200 results in the upper portion 201 of said band sliding upwardly within the mouth of the partly formed cup and in causing the paper at said mouth to be deflected outwardly and downwardly into the base groove 202 of said band and thence outwardly and upwardly, due to the walls of said groove, below the curling lips 242, which turn the paper inwardly and downwardly due to their form and produce, with the aid of the band 200, the beading on the edge of the cup. During the formation of the beading on the cup the blocks or shanks 204 and segments 209 are in rapid rotation, and hence the curling lips 242 are in rapid rotation and effectually curl over the edge portions of the paper to form the beading on the cup. Preparatory to the formation of the beading on the cup, the broad concave ironing surfaces of the segments 209 engage and iron down the portions of the flutes adjacent to them on the partly formed cup and the lips 243 on said segments (Fig. 9) press against and travel around the partly formed inverted cup above the lower edge thereof and serve to deaden or take some of the resiliency out of the paper and in that way facilitate the action of the band 200 and curling lips 242 in forming the beading along the mouth edge of the cup, the feet 244 on the rotating ironing segments 209 at the same time riding on the said beading as formed and operating to resist any tendency of the beading to open up until said beading has been completely finished, at which time the beading has become compact and has lost any power to unfold; at this time also the cup-member 210 is lowered to turn the blocks or shanks 204 and segments 209 outwardly from the cup and free from said beading, and this is followed by the lowering of the cup-member 203 to release the band 200 from said beading, whereupon the yoke frame 173 ascends and the arms or blades 154 retreat upwardly from the folds on the cup and over which said folds were ironed down by the segments 209, said arms 154 finally spreading out automatically entirely free of the cup and the foot 177 moving upwardly free of the bottom of the inverted cup. The forming head 127 then moves to its cup delivery position, shown in Fig. 5, and the entire mechanism of the machine comes to rest.

The blocks or shanks 204 and ironing segments 209 are shown as made in two pieces (Fig. 14) secured together and held in rigid relation to each other by a screw 316 and dowel pin 317, but said two parts 204, 209 may, of course, be made in one integral piece.

The pins 205 by which the shanks or blocks 204 are secured between the arms 207 of the sections of the band 208 carried by the cup member 203, are equipped with springs 245 (Fig. 11) by which said shanks or blocks and the tools carried by them are given a normal tension outwardly from the head or former 127 toward their initial inoperative position shown in Figs. 3, 4 and 5. The tension of the springs 245 is overcome by the upward movement of the cup member 210 and its standards 211 (Fig. 6). When the cup member 210 lowers to permit the release of the ironing members 209 and associated parts from the finished cup, the springs 245 promptly turn said ironing members and associated tools outwardly from the cup, thereby avoiding a downward drag of the curling lips 242 and feet 244 against the beading formed around the lip of the cup. The pins 205 are removable, and may be rotated to tension the springs 245, and said pins are secured in position by set screws 246 (Fig. 11). One end of each spring 245 is secured to its pin 205 and the other end of the spring is socketed in the block or shank 204.

In regard to the details of the bed frame 83 I may say that this frame has a large circular opening over which the paper 53 for the disk-blanks 84 are cut and which disk-blanks are moved downwardly through the opening when the disks are to be shaped on the forming head 127, as hereinbefore explained. The bed frame 83 is formed in its forward portion with a transverse slot 247 and a short longitudinal central forward slot 248 (Figs. 5, 17, 28). The strip of paper 53 fed across the bed-plate or frame 83 has parallel side edges, as shown in Fig. 28, and when circular holes are formed in said strip by the cutting of the disks 84 therefrom, there remain integral portions 249 (Fig. 28) of the strip which it is convenient to remove in the form of clippings so as not to have a long strip with large circular holes cut therein to be disposed of. I therefore provide the transverse slot 247 and longitudinal slot 248 in the forward portion of the bed-plate or frame 83, and in addition to the circular knife 86 carried by the vertically movable frame 85, I secure to said frame at its forward portion a transverse blade 250 and a short longitudinal blade 251 (Figs. 5, 16, 17, 27), these blades being adapted to the aforesaid slots 247, 248 and to sever at said slots the surplus portions 249 of the strip of paper on the descending of the frame 85 to cut the disks 84. The only material details of the bed frame or plate 83 therefore resides in the provision of the central opening therein to cooperate with the circular blade 86 in cutting the disks 84, and in the provision, preferably, of the slots 247, 248, for cooperation with the blades 250, 251 in clipping off surplus portions of the paper strip, leaving the clippings to be cared for instead of a long strip having circular openings in it. The upper surface of the bed frame or plate 83 is flat so as to permit the strip of paper 53 to be fed evenly over it and between the rods 91 and also to cooperate with the stripper 87 which serves to hold the paper flat on the bed frame or plate 83 during the descent of the circular cutter 86 and blades 250, 251 and also during the ascent of said circular cutter and said blades.

The stripper 87 in the construction shown is formed in three sections 88, 89, 90 (Fig. 28), and except for the longitudinal blade 251, the stripper would be formed in two semi-circular sections, but when the blade 251 is made use of I form one-half of the stripper in two segments 89, 90 so that the blade 251 may pass downwardly between them and enter the slot 248 (Fig. 17). The stripper consists generally of a flat ring, and this ring at the opposite sides of the stripper, where the sections thereof meet, are cut out to admit the rods 91 (Figs. 28, 29), and said sections are thereat mounted on springs 254 shown enlarged in Fig. 29, which are seated in sockets formed in the bed-frame or plate 83. The springs 254 normally support the stripper above the bed-frame or plate 83 and operate to return the stripper to its upper position after each depression thereof against the paper by the downward movement of the frame 85.

The stripper 87 is pressed against the strip of paper 53 by a yielding pressure, due to the presence of the springs 254 and the additional springs 255 which are arranged above the stripper 87 and below the frame 85, as shown in Figs. 7, 27, 28. The sections of the stripper 87, adjacent to the rods 91, are provided with downwardly extending arms 256 which are slotted and guide on screws 257 which are stationary with the bed frame or plate 83 (Figs. 3, 16, 17, 27, 28). The arms 256 serve to position the stripper without interfering with the vertical movement of the same. The adjacent end portions of the sections 89, 90 of the stripper are provided with dowel pins 389 (Fig. 28) which enter holes 390 in an annularly projecting portion 391 of the frame 85 (Fig. 27). The stripper springs are so adjusted as to their tension that they tend to move the stripper into a plane substantially parallel with the bed plane or plate 83, and the slotted arms 256 guide the stripper to and from said plate and tend to hold the stripper in planes parallel with said plate.

The cutter frame 85 has an open center for the movement therethrough of the arms or blades 154 and parts associated therewith, as clearly shown, and around the opening in the frame 85 is secured the circular cutter 86, which is a thin vertical circular blade having a continuous line of V-shaped serrations along its lower or cutting edge (Figs. 5, 6, 7, 27), these serrations forming teeth which are sharpened upon both edges and when engaging the paper 53 have the effect of short draw-cuts entirely around the cutter engaging the paper. I have found in practice that the cutter 86 formed with the V-shaped cutting teeth along its lower edge is highly efficient in cutting the disks 84 from the strip of paper, these teeth acting in a manner to efficiently cut out the disks without disturbing their regularity or wrinkling or otherwise interfering with the paper strip or the disks cut therefrom. A circular cutter having a continuous uniform cutting edge may be made use of, but my experience is that the cutter having the toothed lower edge is more efficient in the practical manufacture of the cups.

I have hereinbefore described all of the details of construction of the machine and also the operation of various features thereof, and I have mentioned that a completed cup 55 is formed during each cycle of operation of the machine, and that when the cup is positioned at the door 54 in cup-delivery position, the machine comes to rest. In Fig. 39 I illustrate the circuits by which the machine is started in operation after the door 54 has been opened and the cup 55 removed from the forming head 127 and the door closed to make an electric circuit, this circuit being broken when the forming head 127 carrying a finished cup 125 again reaches its cup-delivery position behind the closed door 54. It has also been explained that after a cup 55 has been removed from the forming head 127, when said head is in its cup-delivery position, and the machine has been started in motion, the forming head, during the cycle of the operation of the machine, is turned to its vertical position, in which position a new cup is formed thereon, and then is returned to its inclined cup-delivery position shown in Fig. 2.

On the end of the shaft 59 there is a wheel or disk 258 having at one point in its periphery a section or block 259 of insulating material. A leaf-spring 260 secured to an insulating block 261 is lightly flexed against the periphery of the wheel or disk 258, and when said spring is engaged with the insulating block 259, the circuit through the machine is broken. Within the main casing of the machine and back of the door 54 there are two contact springs 262, 263, respectively, the spring 262 being secured on an insulating block 264 mounted on a portion of the interior framing of the machine and the contact spring 263 being mounted on an insulated block 265 carried by the door 54. From the contact spring 263 a conductor 266 leads to a conductor 267, whence a conductor 268 leads to the bare portion of the disk or wheel 258. The conductor 267 extends from one pole of the motor 57; from the other pole of the motor 57 a conductor 269 leads to a manually operative make and break switch 270, from which a conductor 271 leads to a binding post of the spring 260; from the spring 260 a conductor 272 leads to the spring contact 262, and from the contact 262 to the contact 263 the circuit is made by the engagement with said contacts of the metal forming-head 127 when said head is bare or after a cup has been removed therefrom. If we assume that a cup 55 is on the forming head 127 and that said head is in its cup-delivery position, the cup will bridge across the spring contacts 262, 263 and, being of insulating material, will prevent a circuit from the contact 262 to the contact 263. If we now assume that the door 54 has been opened and the cup 55 removed from the forming-head 127 and that the door has been reclosed, it will be seen that the spring contact 263 becomes flexed against the bare forming head 127 and that said forming head is pressed against the upper end of the spring contact 262. In this condition of the apparatus it is desired that the machine shall operate and produce another cup and move the same to cup-delivery position, and therefore, upon the closing of the door 54, a circuit is made from the spring contact 262 to the forming head 127, from the forming head 127 to the spring contact 263, and thence through the conductors 266, 267, motor 57, conductor 269, switch 270, and conductor 271 to the spring finger 260, and thence through the conductor 272 to the spring contact 262, thus making a complete circuit and setting the motor 57 in operation to impart motion to the shaft 58, and thence to the shaft 59 and other features of the mechanism, which results in the forming head 127 being turned upwardly to its vertical position. There is sufficient yield in the spring contacts 262, 263 to maintain electrical connection with the forming head 127 long enough for the wheel or disk 258 to carry the insulating block 259 from the spring finger 260, and therefore until the shaft 59 has turned sufficiently for the disk 258 to carry the insulating block 259 from the end of the spring finger 260, the circuit will be from the spring contact 262 through the forming head 127 and to the spring contact 263, as hereinbefore described. After the forming head 127 is turned upwardly from the spring contacts 262, 263, the circuit will be broken between said contacts, and the circuit then will be continued from the motor 57 through the conductors 267, 268 to the wheel or disk 258, and from said wheel or disk to the spring finger 260, whence the circuit will be continued through the conductor 271, switch 270 and conductor 269 to the other pole of the motor 57. The mechanism will thus be continued in motion after the forming head 127 has left the spring contacts 262 and 263 and is turning to and remaining stationary at its upper cup-forming position. The machine will continue in motion until the cup has been completely formed on the head 127, and said head is turned forwardly to its cup-delivery position against the spring contacts 262, 263 and the disk or wheel 258 has rotated sufficiently to return its block of insulating material 259 against the spring finger 260, the circuit through the machine then being broken and the mechanism coming to a rest. All of the mechanical operations necessary to the movement of the forming head from its cup-delivery position to its vertical cup-forming position and for the complete formation of the cup on said head and the return of said head to cup-delivery position, are performed during one cycle of operation of the machine, and as hereinbefore explained, when the forming head 127 carries a cup to cup-delivery position behind the door 54, the arm 128 becomes actuated by a part connected with the forming head 127 to unlatch the door 54 and hold the same unlatched so that a person desiring a cup may open the door 54, remove the cup from the forming head and reclose said door. The door 54 cannot be opened until after the door has become unlatched from within the casing by the movement of the forming head 127 to its cup-delivery position.

The electric circuits for operating the mechanism may be formed in various ways, and therefore Fig. 39 may be regarded as suggestive of one arrangement, and in this arrangement I ground the circuits through the mechanism of the machine.

*Operation*

The operation of many parts of the machine will be understood without further extended detailed explanation as to the same. The strip of paper from which the cups are made is fed from the roll or reel 99 and passes between the feed rollers 100, 101, and thence over the bed-plate 83 and below the stripper 87. The paper is given an intermittent travel, as hereinbefore explained, and the mechanism for imparting motion from the shaft 60 to the feed roller 100 is illustrated in detail in Figs. 25 and 26 and has been hereinbefore specifically described.

In the operation of the machine I time the feeding of the strip of paper 53 in such manner that when the forming head 127 carries a completed cup 55 to its cup-delivery position, the end of the paper strip will, during the movement of said head to its cup-delivery position, be fed across about one-half of the opening in the bed-plate or frame 83, this situation being illustrated in Fig. 5, and that during the movement of the forming head 127 from its cup-delivery position to its vertical cup-forming position, the feed roller 100 will be actuated to effect the travel of the paper 53 entirely across and slightly beyond the circular opening in the bed-plate or frame 83, thereby providing sufficient paper over the bed-plate or frame 83 for the formation of a disk-blank 84, this position of the strip of paper being shown in Figs. 4 and 17. Upon the arrival of the forming head 127 to its vertical position, the frame 85 carrying the knives or cutters 86, 250 and 251 descends pressing the stripper 87 upon the paper 53 and effecting the cutting out of the disk 84 from said paper by means of the cutter 86 and the slitting of the forward surplus portion of the paper by the cutters 250, 251, this position of the cutters and frame 85 being shown in Figs. 3 and 4. Upon the cutting out of the disk 84 for a cup, the yoke frame 173 is drawn downwardly by the rods 190, and on the downward movement of the circular frame 185 forming a portion of said yoke frame, the blades or arms 154 are turned downwardly and the presser foot disk 177 engages the central portion of the disk, pressing the same against the top of the forming head 127. Previous to the cutting out of the disk 84 and the descent of the yoke frame 173, the cam 162 acting on the rod 158 moves the head 157 upwardly to spread out the fluting blades 153 to the position shown in Fig. 3. On the descent of the frame 185 against the blades or arms 154, said blades or arms flute the paper of the disk 84 downwardly upon and between the blades 153, said blades in the meantime closing downwardly in the manner indicated in Fig. 6. Finally the arms or blades 154 reach the sides of the forming head 127, and the blades 153 retire into the slots of said forming head, leaving the arms or blades 154 holding the fluted cup blank against the forming head 127. At about this point in the operation, the clutch members 67, 69 are thrown into engagement with each other by gear wheel 70 and thence to the bevel gear wheel 71 and therethrough to the tubular rod 218, from which the cup members 210, 203 are placed in rapid rotation, said cup members at this time being in their lower position shown in Fig. 6, with the ironing segments 209 and their associated parts in their outer inoperative position shown in Figs. 3, 4, 5 and 6. This condition of the parts of the machine are immediately followed by the upward movement of the cup member 210 to the position shown in Fig. 8, this movement turning the blocks or shanks 204, ironing segments 209 and associated parts upwardly to their upper position shown in Figs. 8 and 9, the cup members and parts 204 and 209 being in rapid rotation as said ironing members approach the flutes formed on the cup blank and held in correct formation by the arms or blades 154. The ironing segments 209 then immediately commence to iron down the flutes at the then lower portion of the inverted cup blank, the creasing or deadening lips 243 rotate against the ironed-down portions of the flutes, and the curling tool 243 presses and rides against the extreme lower portions of the cup blank, these operations being shown in Figs. 8 and 9. After the tools 209, 243 and 242 have rotated a few moments against the flutes at the lower portions of the cup blank so as to turn said flutes over upon the lower tapered portions of the blades or arms 154, thereby transforming said portions of the flutes into plaits, the cup members 210 and 203 move upwardly together, while at the same time rotating rapidly, and thereby move the ironing segments 209 and tools 243 and 242 upwardly along the lower edge of the cup blank and at the same time move the annular band 200 upwardly, carrying the tapered portion 201 of said band and the annular groove 202 of said band upwardly against the lower deflected edges of the cup blank or from the position shown in Figs. 8 and 9 to that shown in Fig. 10, whereby the lower edges of the cup blank are curled outwardly upon themselves and formed into the annular beading illustrated in Figs. 5, 7 and 10, the feet 244 on the segments 209 constantly rotating over the upper edges of said beading as formed and compacting and preventing the opening out of the same.

Upon the completion of the paper cup on the forming head 127 then in its vertical position, the cup member 210 is lowered to permit the springs 245 to turn the shanks 204 and ironing segments 209 outwardly from the cup, and thereafter both the cup members 210, 203 descend together. The yoke frame and rod 186 then latched together by the dog 195 ascend together to withdraw the blades or arms 154 upwardly out of the plaits formed prevented from disturbing said plaits, and this upward movement of the yoke 173 and rod 168 will continue uniformly until the inclined edge 199 of the arm 197 is reached by the arm 196 at the upper end of the pivoted dog 195 and turns said dog outwardly from engagement with the rod 168, at which time the yoke 173 will continue to ascend to its initial position and the spring 184 will expand to press the cam disk 182 downwardly against the fingers 181 at the upper ends of the arms of blades 154 to turn said blades outwardly to their spread out position, shown in Fig. 3. The several parts of the machine have at this stage completed the formation of the cup on the forming head and have retired therefrom, and thereupon during the continued operation of the mechanism of the machine the forming head 127 carrying the cup is turned to its cup-delivery position shown in Fig. 5. During the movement of the forming head 127 carrying the cup 55 to the cup delivery position, the feed mechanism for the paper 53 will feed a certain length of the paper over the bed-plate or frame 83, as hereinbefore described and as shown in Fig. 5. Upon the arrival of the forming head and completed cup 55 to cup delivery position behind the door 54, the electric circuit becomes broken by the block of insulating material 259 in the wheel or disk 258 reaching the spring 260, as shown in Figs. 2 and 39. At this stage of the operation the cup on the forming head 127 acts as insulating material to insulate said head from the spring contacts 262, 263. When the door 54 is opened by a person desiring a cup and the cup is removed from the forming head 127 and the door closed, the metal in said head forms a conductor between the spring contacts 262, 263 and sets up an electric circuit which permits the motor 57 to again start the mechanism through another cycle of operation, the forming head 127 being turned upwardly as before and the paper strip 53 being fed to a further extent forwardly over the bed or frame 83 and the steps of the operation hereinbefore described then being repeated until another cup has been formed and carried to position behind the closed door 54.

It is to be noted that the paper cup 55 is completed and transported to cup-delivery position without the intervention of the human hand, and hence the hand of the person desiring the cup and opening the door 54 to take the same, is the only hand that touches the cup.

I have described in considerable detail the mechanism for manufacturing the cups from a strip of paper 53 unwinding from the roll 99, but I do not confine my invention to all of the details of form, construction and arrangement hereinbefore described, since I am aware that many changes may be made in the details of the mechanism without departing from the spirit of the invention and within the scope of the appended claims.

The invention is not limited to the employment of the special motor 57 for driving the mechanism of the machine, and said motor is to be regarded merely as a means for transmitting motion to the mechanical parts of the machine.

In Figs. 30 to 38 inclusive I have illustrated the product of the machine, to-wit, the cup 55, in considerable detail, with the view of avoiding extended description as to the same. The remaining portions of the flutes formed in the paper disk by means of the blades 153 and arms or blades 154, are lettered A, and the plaits formed adjacent to the mouth edge of the cup by the ironing down of those portions of the flutes thereat by the ironing-segments 209 are lettered B. The purpose of imparting vertical movement to the arms or blades 154 before allowing the same to spread outwardly is to retire said arms or blades by direct upward movement from within the plaits B. If the outer ends of the arms or blades 154 should be permitted to spread outwardly before retiring from the plaits B, said arms or blades would naturally disturb said plaits and possibly distort the mouth end of the cup. The beading around the mouth edge of the cup is lettered C, and it will be seen on reference to Fig. 33 that this beading is composed of the main smooth surface of the disk-blank and of the layers of paper constituting the plaits B, these layers of paper being curled outwardly and under so as to form a rounded beading for the lip of the cup. In Fig. 31 it is indicated that the edges of the plaits at the beading C, due to the overlapping of the plaits B, extend on angular lines, which lines are also represented in Fig. 30. The overlapping of the plaits B and the formation of the beading C therefrom by the annular band 200, creasing or deadening lips 243, curling tools 242, and feet 244, results in the beading being very firm and compact and having an annularly drawn effect which leaves the beading entirely capable of resisting expansion of the cup at the mouth thereof or of the cup becoming otherwise distorted by ordinary use. It is believed that the details as to the construction of the cup produced by the machine of my invention, will be fully understood on reference to Figs. 30 to 38 inclusive without further explanation.

What I claim as my invention and desire to secure by Letters Patent, is:

1. A method of making cups, comprising providing a sheet of thin flexible material and forming therefrom a folded cup approximately in situ in one forming zone, and, while the folded cup is under control in that zone, also rotating the cup and forming an annular, outwardly and inwardly rolled, bead at the mouth of the folded cup, whereby a complete, self-sustaining cup is finished approximately in situ while in that zone.

2. A method of making cups, comprising, forming a cup with upward flutes from a sheet of dry and thin flexible material, and rolling a bead outwardly and inwardly around the fluted mouth portion of the cup while still dry.

3. A method of making cups, comprising providing a disk of thin flexible material, and forming, from the dry unmoistened material, a complete, fluted cup, and rotating and making the cup self-sustaining while the material is dry, thus preserving the intact condition of the material.

4. A method of making cups, comprising providing a sheet of thin flexible material, holding the central portion of the sheet which is to constitute the bottom of the cup, and forming a complete, self-sustaining cup without interruption first with folds and then with a rolled bead, while the sheet is so held.

5. A method of making cups, comprising, forming a cup with upward flutes from a sheet of dry and thin flexible material, and providing securing means at the rim of the cup for sustaining the flutes in outstanding condition.

6. A method of making cups, comprising providing a sheet of thin flexible material, holding the central portion of the sheet which is to constitute the bottom of the cup, and forming a cup wihout interruption while the sheet is so held, and also forming an annular, outwardly and inwardly rolled, bead at the mouth of the cup and finishing the cup without interruption in the work while the sheet is so held.

7. A method of making cups, comprising providing a disk of thin flexible material, forming therefrom a complete, folded cup with an inwardly rolled edge bead substantially about the axis of a given zone of formation, and performing the step of folding and the step of rolling without interruption of the forming movements.

8. A method of making cups, comprising feeding a web of thin flexible material, cutting disks successively from said web within the marginal portions of said web and delivering the successive disks, forming successively cups from said disks, and forming an annular bead on each cup, the complete formation of each cup taking place wholly about the axis of a zone in which such axis is also the axis of the completed cup.

9. A method of making cups, comprising providing a disk of thin flexible material, forming therefrom, a complete, folded cup with a rolled edge, and carrying out the said forming and edge rolling on an axis substantially coincident with the center of the disk.

10. In a cup making machine, the combination of means for providing a suitable sheet of thin flexible material, means for forming from the material a complete, folded, self-sustaining cup in situ approximately in one forming zone, and means for forming in the same zone an annular bead at the mouth of the folded cup.

11. In a cup making machine, the combination of means for providing a suitable sheet of thin flexible material, means for forming from the material a complete, folded, self-sustaining cup in situ approximately in one forming zone, means for forming in the same zone an annular bead at the mouth of the folded cup, and means for operating the folding and beading means successively but without interruption in the formation of the cup.

12. In a cup making machine, the combination of means for providing a suitable sheet of thin flexible material, means for holding the central portion of the sheet which is to constitute the bottom of the cup, and means for forming a complete, self-sustaining cup without interruption while the sheet is held, such forming means comprising folding mechanism and bead-rolling mechanism.

13. In a cup making machine, the combination of means for providing a suitable sheet of thin flexible material, means for maintaining the central portion of the sheet which is to constitute the bottom of the cup in one plane, and means for forming the cup and rolling a bead toward said plane without interruption while the central portion of the sheet is maintained in said plane.

14. In a cup making machine, the combination of means for providing a suitable sheet of thin flexible material, means for holding the central portion of the sheet which is to constitute the bottom of the cup, means for forming a cup without interruption while the sheet is held, and means for rolling an annular bead at the mouth of the cup and for finishing the cup without interruption in the work while the central portion of the sheet is held.

15. In a cup making machine, the combination of means for providing a disk of thin flexible material, and means for forming a complete, folded cup from the material including means for forming it, while subjected to rotation, with an inwardly rolled edge bead in situ in substantially a given zone of formation, and means for operating such means without interruption of the movements in forming the completed cup.

16. In a cup making machine, the combination of means for feeding a web of thin flexible material, means for successively cutting complete disks from said web within the marginal portions of said web and for delivering the successive disks, and cup forming and beading means for forming successively and completely from said disks cups with beaded mouths, said forming means acting wholly about the axis of a zone, which axis is also the axis of the completed cup.

17. In a cup making machine, the combination of means for providing a disk of thin flexible material, means for forming from the material a folded cup, and means for forming the cup with a rolled edge on an axis substantially coincident with the center of the disk.

18. In a cup making machine, the combination with means for intermittently delivering disks of thin flexible material to cup forming means, of the forming means, comprising folding and bead-rolling instrumentalities for starting and performing the making of a self-sustaining cup from each disk during the interval of rest of the delivering means, said instrumentalities continuously operating in forming a cup, within a zone restricted to the immediate vicinity of the point of delivery of the disks.

19. In a cup making machine, the combination with means for intermittently delivering disks of thin flexible material to cup forming means, of the forming means, comprising forming instrumentalities for starting and performing the making of a cup from each disk and for rolling onto each cup a finishing bead during the interval of rest of the delivering means, said instrumentalities continuously operating in forming a cup, within a zone restricted to the immediate vicinity of the point of delivery of the disks.

20. In a cup making machine, in combination, means for advancing a sheet of thin flexible material, means for cutting a disk from the sheet, means for fluting the disk into cup form around the middle portion of the disk which is to form the bottom of the cup, means for pressing and turning down the flutes to form plaits at the outer end of the cup, means for crimping and turning the rim of the cup to form a roll for sustaining the cup when delivered from the machine, means for delivering this completed and finished cup, and means for operating all of the aforesaid means in succession without halt and from the beginning to and including the delivery of that cup.

21. A cup making machine comprising, means for supporting a roll of paper, means for advancing a predetermined length of paper from the roll, means for cutting a disk from the length of paper, a cup forming head, two series of fingers, means movable independently of the head for actuating both series of fingers to cause them to cooperate with the head to fold a cup blank thereon, and means for finishing the cup while it is on the head.

22. A cup making machine comprising, means for supporting a roll of paper, means for advancing a predetermined length of paper from the roll, means for cutting a disk from the length of paper, means for folding the disk into a cup blank having outstanding fluted sides, means for folding down the free ends of the flutes to form plaits at the mouth of the cup-blank while leaving the other portions of the flutes outstanding, and means for rolling the edges of the said free ends of the flutes to form a bead around the rim of the cup to prevent the outstanding portions and the folded down portions from unfolding.

23. A cup making machine comprising, means for supporting a length of paper, means for cutting a disk from the paper, a cup forming head, a series of fingers for engaging one side of the disk, a second series of fingers for engaging the other side of the disk, means movable independently of the head for actuating both series of fingers to cause them to form on the head a cup blank having folded sides, means for folding down the free ends of the folds, and means for rounding over the rim of the cup to prevent the folds from unfolding.

24. A cup making machine comprising, a cone-shaped cup forming head, means for positioning a disk of paper upon the small end of the head, means movable independently of the head for folding the disk upon the head to form a cup blank, means for finishing the cup while it is on the head, a series of cams for actuating the foregoing means, the cup being formed during one revolution of the cams.

25. A cup making machine comprising, a cone-shaped cup forming head, means for positioning a disk of paper upon the small end of the head, means movable independently of the head for folding the disk upon the head to form a cup blank, and means for finishing the cup while it is on the head.

26. A cup making machine comprising, means for supporting a roll of paper, means for advancing a predetermined length of paper from the roll, means for cutting a disk from the length of paper, two series of co-operating fingers for engaging the disk on opposite sides, a cone-shaped head on which the cup is to be formed, means for actuating the fingers to form on the head a cup blank having fluted sides, means for folding down the free ends of the flutes, means for forming the edges of the free ends of the flutes into a bead extending around the rim of the cup, and means for timing the movements of the fingers, the folding down means and the bead forming means while said head is in substantially one location.

27. A machine for making cups comprising, means for supporting a length of paper, means for cutting a disk from the paper, a cup forming head, a series of fingers movably connected with the head and normally received within slots in the head, a second series of fingers, means for actuating the two series of fingers to cause them to cooperate to form on the head a cup blank having fluted sides, means for folding down the free ends of the flutes, means for turning over the edges of the free ends of the flutes to form a bead around the rim of the cup to hold flutes from unfolding, and means for timing the movements of both series of fingers, the folding down means and the bead forming means while said head is in substantially one location.

28. A cup making machine comprising, an inverted cup forming head having substantially one location while the cup is being formed, a series of fingers movably connected with the head and normally received within slots in the head, a second series of movable fingers positioned above the head, means for positioning a paper disk between the second series of fingers and the upper end of the head, means for actuating the two series of fingers to cause them to cooperate to form on the head a cup blank with fluted sides, means for folding down the free ends of the flutes, and means for turning under the edges of the free ends of the flutes to prevent the flutes from unfolding.

29. A cup making machine comprising, an inverted cup forming head having substantially one location while the cup is being formed, a series of fingers movably connected with the head and normally received within slots in the head, a second series of movable fingers located above the head and arranged in staggered relation with the first series of fingers, means for supporting a roll of paper, means for feeding a length of the paper under the second series of fingers, means for cutting a disk from the paper located under the second series of fingers, means for actuating the two series of fingers while the head is in said location to cause them to cooperate to form on the head a cup blank, and means for rolling the ends of the folded sides of the cup blank to form a bead around the rim of the cup.

30. A cup making machine comprising, means for supporting a roll of paper, means for advancing a predetermined length of the paper, means for cutting a disk from the length of paper, a cone-shaped cup forming head, means for positioning the head with its small end opposite the center of the paper disk for maintaining said end at a point there adjacent, and for moving the head to cup delivery position when the cup has been made, and means cooperating with the head to form thereon a cup from the disk of paper while the head is in such maintained position.

31. A cup making machine comprising, a pivotally mounted cup forming head, means for holding the head in upright position during the cup forming operation, means for moving the head to cup delivery position after the cup has been made, means for supporting a roll of the paper, means for advancing a predetermined length of the paper over the head, means for cutting a disk from the length of paper, a series of fingers located about the head and the disk of paper, a series of fingers movably connected with the head and adapted to be normally received within slots in the head, means for actuating the two series of fingers to cause them to cooperate to form on the head a cup blank with fluted sides, revolving means for folding down the free ends of the flutes, and means connected with the folding means for inturning the free ends of the flutes to form a bead around the rim of the cup.

32. A cup making machine comprising, an inverted cone-shaped cup forming head movable from upright cup forming position to to cup delivery position after a cup has been made and for returning the head to upright position, means for supporting a roll of paper, means for feeding a predetermined length of paper over the head, means for cutting a disk from the length of paper, a series of fingers pivotally connected at their upper ends with the upper end of the head and normally received within slots in the head, a second series of pivotally mounted fingers located over the head, means for actuating the two series of fingers to cause them to cooperate to form on the head the cup blank with fluted sides, means for folding down the free ends of the flutes, and means for inturning the free ends of the flutes to form a bead around the rim of the cup.

33. A cup making machine comprising, a cup forming head, means for moving the head from its cup forming position after a cup has been formed to a point at which the the cup is delivered and for returning the head to cup forming position, means for positioning a disk of paper opposite the end of the head when it is in cup forming position, a series of fingers located on one side of the disk, series of fingers located on the other side of the disk, means for actuating the fingers to cause them to cooperate to form on the head a cup blank having fluted sides, means for holding down the free ends of the flutes, and means for inturning the edges of the free ends of the flutes to form a bead around the rim of the cup to prevent the flutes from unfolding.

34. A cup making machine comprising, a cup forming head, means for positioning a length of paper opposite the head, means for cooperating with the head to form thereon a cup from the disk, a series of cams for actuating the paper cutting and cup forming means, a motor, a circuit in which the motor is located, a switch located in the circuit and mounted to turn synchronously with the cams, and a piece of insulating material in the switch for breaking the circuit when the switch has made a single revolution.

35. A cup making machine comprising, a cup forming head, means for moving the head from cup forming position to a point at which the cup is delivered and for returning it to cup forming position, means for positioning a disk of paper opposite the head, a series of fingers connected with the head, a second series of fingers for cooperating with the first series of fingers to form on the head a cup blank having fluted sides, means for forming a bead around the rim of the cup while it is on the head, a series of cams for actuating the head moving and the cup forming means, a motor, a circuit in which the motor is located, a switch for controlling the circuit, a second switch located in the circuit and mounted to turn synchronously with the cams, and a piece of insulating material in the second switch for breaking the circuit when the second switch has made a single revolution.

36. A cup making machine comprising, a cup forming head, means for supporting a length of paper opposite the head, means for cutting a disk from the length of paper, a series of fingers movably connected with the head for engaging one side of the disk, a second series of fingers, for engaging the other side of the disk, said fingers being arranged to cooperate with the head to form thereon a cup blank, means for forming a bead around the rim of the cup, a series of cams for actuating the foregoing means, a motor for driving the cams, a swicth controlled circuit in which the motor is located, a second switch located across the circuit and mounted to turn synchronously with the cams, and a piece of insulating material in the second switch for breaking the circuit when the second switch has made a single revolution.

37. A cup making machine comprising, cup forming means, means for feeding a disk of paper to the cup forming means, a series of cams for actuating the paper feeding and the cup forming means, a motor for driving the cams, a switch controlled circuit in which the motor is located, a second switch located across the circuit mounted to move synchronously with the cams, and a piece of insulating material in the second switch for breaking the circuit when the second switch has made a single revolution.

38. A cup making machine comprising, means for supporting a length of paper, means for cutting a disk from the paper, means for forming the disk into a cup, a series of cams for actuating the paper cutting and cup forming means, and means for stopping the machine when the cams have made a single revolution.

39. A cup making machine comprising, means for supporting a length of paper, means for cutting a disk from the paper, means for forming the disk into a cup, a series of cams for actuating the paper cutting and cup forming means, a motor for driving the cams, and means for automatically breaking the circuit through the motor when the cams have made a single revolution.

40. A cup making machine comprising, means for supporting a length of paper, means for cutting a disk from the paper, means for forming a cup from the disk of paper, means for actuating the paper cutting and cup forming means, a motor for driving the actuating means, a switch controlled circuit in which the motor is located, a second switch located across the circuit and mounted to rotate, and a piece of insulating material on the second switch for breaking the circuit when it has made a single revolution.

41. A cup forming machine comprising, a cone-shaped cup forming head movable into and out of cup forming position, means for supporting a roll of paper, means for advancing a predetermined length of the paper to a point opposite the cup forming position of the head, means for cutting, a disk from the paper, two series of fingers for cooperating with the head to form a cup blank thereon having fluted sides, means for folding down the free ends of the flutes, means for forming the edges of the free ends of the flutes into a bead extending around the rim of the cup, a series of cams for actuating the foregoing means, a motor for driving the cams, a switch controlled circuit in which the motor is located, a second switch located across the circuit and mounted to rotate, and a piece of insulating material in the second switch for breaking the circuit when it has completed a single revolution.

42. A cup making machine comprising, a movable cup forming head, means for moving the head from its cup forming position after a cup has been completed on it to a point at which the cup is delivered, means for supporting a roll of paper, means for advancing a predetermined length of the paper, means for cutting a disk from the length of paper, a series of fingers movably connected with the head for engaging one side of the disk of paper, said fingers being arranged to be received within slots in the head, a second series of movable fingers arranged in staggered relation with the first series and adapted to engage the other side of the disk of paper, means for yieldingly holding the first series of fingers against the paper, means for actuating the second series of fingers to cause them to cooperate with the first series of fingers to form on the head a cup blank having fluted sides, a series of ironing members for folding down the free ends of the flutes, means for revolving the ironing members, means for turning under the edges of the free ends of the flutes to form a bead around the rim of the cup, and a series of cams for actuating the foregoing instrumentalities.

43. A cup making machine comprising, a movable cup forming head, means for holding the head in an upright position for the cup forming operation, means for moving the head on the completion of a cup to a point at which the cup is delivered, means for supporting a roll of paper, means for advancing a length of the paper to a point over the upright position of the head, means for cutting a disk from the length of paper, a series of fingers movably connected with the head and adapted to engage with the underside of the disk of paper, said fingers being arranged to be received within slots in the head, a second series of movably mounted fingers arranged in staggered relation with the first series of fingers and adapted to engage with the upper side of the disk of paper, means for yieldingly holding the first series of fingers in their paper contacting position, means for moving the second series of fingers to cause them to cooperate with the first series of fingers to form on the head a cup blank having fluted sides, a series of revolving members for folding down the free ends of the flutes, means for rolling over the edges of the free ends of the flutes to form a bead around the rim of the cup, a series of cams for actuating the foregoing instrumentalities, a motor for driving the cams, a switch controlled circuit in which the motor is located, and a second switch across the circuit mounted to rotate synchronously with the cams for controlling the operation of the motor.

44. A cup making machine comprising, a pivotally mounted inverted cup forming head, means for holding the head in upright position during the formation of the cup, means for moving the head to a point at which the cup is delivered, means for supporting a roll of paper, means for feeding a length of the paper to a point over the cup forming position of the head, a circular knife for cutting a disk from the length of paper, a series of fingers pivotally mounted at one end in the upper end of the head and adapted to be received within slots in the head, means for yieldingly holding the fingers in position to engage with the underside of the disk, a second series of pivotally mounted fingers arranged in staggered relation with the first series of fingers and adapted to engage with the upper side of the disk, means for engaging the second series of fingers to cause them to cooperate with the first series of fingers to form on the head a cup blank having fluted sides, a series of revolving members for folding down the free ends of the flutes, means for rounding over the edges of the free ends of the flutes to form a bead around the rim of the cup, means for withdrawing the second series of fingers from the flutes longitudinally, a series of cams for actuating the foregoing instrumentalities, a motor for driving the cams, and means for automatically stopping the motor when the cams have made a single revolution.

45. A cup making machine comprising, a pivoted inverted cup forming head, means for holding the head in upright position during the formation of the cup, means for moving the head to a point to deliver the completed cup, means for supporting a roll of paper, means for advancing a length of the paper to a point over the upright position of the head, means for cutting a disk from the paper, a series of fingers pivotally connected with the upper end of the head for engaging with the underside of the disk of paper, said fingers being arranged to be received within slots in the head, means for yieldingly holding the fingers against the paper, a second series of pivotally mounted fingers arranged in staggered relation with the first series of fingers and adapted to engage with the upper side of the disk of paper, means for yieldingly holding the second series of fingers in their normal position, a cylinder having parts for engaging with the second series of fingers to cause them to cooperate with the first series of fingers to form on the head a cup blank having fluted sides, a series of ironing members for folding down the free ends of the flutes, a vertically slidable sleeve on which the ironing members are mounted, means for rotating the sleeve, cooperating means on the sleeve and the ironing members for inturning the edges of the free ends of the flutes to form a bead around the rim of the cup, a series of cams for actuating the foregoing instrumentalities, a motor for driving the cams, and means for automatically stopping the motor when the cams have made a single revolution.

46. A cup making machine comprising, a cup forming head, a series of fingers movably connected with the head and arranged to be received within slots in the head, a second series of normally outspread fingers located opposite the head means for supporting a disk of paper between the head and the second series of fingers, means for yieldingly holding the first series of fingers outspread preparatory to the cup forming operation, means for actuating the second series of fingers to cause them to cooperate with the first series of fingers to form on the head a cup blank having fluted sides, means for folding down the free ends of the flutes, means for rounding over the edges of the free ends of the flutes to form a bead around the rim of the cup, means for withdrawing the second series of fingers longitudinally from the flutes before they return to normal outspread position, and means for actuating the cup forming means.

47. A cup making machine, comprising, a forming head, means positioned to deliver a disk of flexible material to the head, means for forming from each disk a fluted cup about the head, and means for forming an annular bead at the mouth of the cup while it is on the head.

48. A cup making machine, comprising, a forming head, means positioned to deliver a disk of flexible material to the head, means for forming from each disk a fluted cup about the head, means for folding down the free ends of the flutes to form plaits at the mouth of the cup, and means for turning back the said free ends.

49. A cup making machine, comprising, a forming head, means positioned to deliver a disk of flexible material to the head, means for forming from each disk a fluted cup about the head, means for folding down the free ends of the flutes to form plaits at the mouth of the cup, and means for rolling back the mouth portion of the cup and the free ends to form a rolled bead.

50. A cup making machine, comprising, a movable forming head, means for providing successive disks of flexible material, means for positioning the head with its receiving end opposite to each succeeding disk, pivoted fingers for forming from the disk a complete, self-sustaining, cup around the head while it is in such position, and means for moving the head away from such position to cup delivery position.

51. A cup making machine, comprising, a pivoted forming head, means for providing successive disks of flexible material, means for positioning the head with its receiving end opposite to each succeeding disk, pivoted fingers for forming from the disk a complete, self-sustaining, cup around the head while it is in such position, and means for moving the head, together with some of the fingers, on its pivot away from such position to cup delivery position.

52. A cup making machine, comprising, a cup forming head, means for supplying disks of thin flexible material to said head, two series of fingers, means movable independently of the head for actuating both series of fingers to cause them to cooperate with the head to fold a disk thereover and form a cup blank, and means for finishing the cup at its mouth while it is on the said head and to make the cup self-sustaining.

53. A cup making machine, comprising, means for folding a disk of flexible material into a cup blank having outstanding fluted sides, means for folding down the free ends of the flutes to form plaits at the mouth of the cup while leaving the other portions of the flutes outstanding, and means for rolling the edges of the said free ends of the flutes to form a bead around the rim of the cup to prevent the outstanding portions and the folded down portions from unfolding.

54. A cup making machine, comprising, a cup forming head, a series of fingers for engaging one side of a disk of thin flexible material, a second series of fingers for engaging the other side of the disk, means movable independently of the head for actuating both series of fingers to cause them to form over the head a cup blank having folded sides, means for folding down the free ends of the folds, and means for rounding over the rim of the cup to prevent the folds from unfolding.

55. A cup making machine, comprising, two series of cooperating fingers for engaging opposite sides of a disk of thin flexible material, a head over which the cup is to be formed from said disk, means for actuating the fingers to form over the head a cup blank having fluted sides, means for folding down the free ends of the flutes, means for forming the edges of the free ends of the flutes into a bead extending around the rim of the cup, and means for timing the movement of the fingers, the folding down means and the bead forming means while said head is in substantially one location.

56. A machine for making cups, comprising, a cup forming head, a series of fingers movably connected with the head and normally received within slots in the head, a second series of fingers, means for actuating the two series of fingers to cause them to cooperate to form over the head a cup blank having fluted sides, means for folding down the free ends of the flutes, means for turning over the edges of the free ends to form a bead around the rim of the cup to hold the flutes from unfolding, and means for timing the movements of both series of fingers, the folding down means and the bead forming means while said head is in substantially one location.

57. A cup making machine, comprising, a cup forming head, means for supplying a disk of thin flexible material, means for positioning the head with one end opposite the center of the disk, for maintaining said end at a point there adjacent, and for moving the head to cup delivery position when the cup has been made, and finger means cooperating with the head to form thereon a cup from the disk of paper while the head is in such maintained position.

58. A cup making machine, comprising, a movable cup forming head, means for holding the head in a given position during the cup forming operation, means for moving the head from that position to cup delivery position after the cup has been made, means for supplying a disk of thin flexible material to the head, a series of fingers located about the head and the position of the disk, a series of fingers movably connected with the head and adapted to be normally received within slots in the head, means for actuating the two series of fingers to cause them to cooperate to form over the head a cup blank with folded sides, revolving means for folding down the free ends of the folds, and means connected with the folding means for inturning the free ends of the folds to form a bead around the rim of the cup.

59. A cup making machine, comprising, a cup forming head movable from an upright cup forming position to cup delivery position after a cup has been made and returnable to upright position, means for supplying disks of thin flexible material one after the other over the head, a series of fingers pivotally connected at their upper ends with the upper end of the head and normally received within slots in the head, a second series of pivotally mounted fingers located over the head, means for actuating the two series of fingers to cause them to cooperate to form over the head a cup blank with folded sides, means for folding down the free ends of the folds, and means for inturning the free ends of the folds to form a bead around the rim of the cup.

60. A cup making machine, comprising, means for supplying disks of thin flexible material, a series of fingers located on one side of the point of supply of each disk, a series of fingers located on the other side of the disk, means for actuating the fingers to cause them to cooperate to form a cup blank having fluted sides, means for folding down the free ends of the flutes, and means for inturning the edges of the free ends of the flutes to form a bead around the rim of the cup to prevent the flutes from unfolding.

61. A cup making machine, comprising, means for forming a folded cup from a sheet of flexible material, revoluble means for folding down the free ends of the folds, means for turning under the edges of the free ends of the folds to form a bead around the rim of the cup, and means for actuating the specified means.

62. A cup making machine, comprising, means for forming a folded cup from a sheet of flexible material, a series of ironing members for folding down the free ends of the folds, means for revolving the ironing members, means for turning under the edges of the free ends of the folds to form a bead around the rim of the cup, and means for actuating the specified means.

63. A cup making machine, comprising, instrumentalities for forming a fluted cup from flexible sheet material, means for delivering the sheet thereto, such instrumentalities making such cup without their complete bodily movement away from sheet delivery position, means for forming a bead at the rim of the cup for holding the flutes in outstanding position on the cup, means for causing the bead forming means to act while the cup is in the position when the flutes are being formed, and means for moving the completed cup to delivery position.

64. In a cup making machine, the combination of a swingable cup forming head, means comprising movable fingers on the head for forming a cup from sheet material about the head, and means for swinging the head with its fingers respectively away from the forming means and back to the forming means.

65. A cup making machine, comprising, a movable forming head, means for forming a folded cup of sheet material about the head, means associated with and cooperating with the said head to form a bead at the rim of the cup, means to move the associated means away from the said head, and means to move the said head away from the forming means.

66. A cup making machine, comprising, a head which is pivoted at one end, means for delivering a sheet of flexible material at the other end of the head, means for forming a folded cup from such material, about the head, means associated with and cooperating with the said head to form a bead at the rim of the cup, means to move the associated means away from the said head, and means to swing the head on its pivot to move it away from the forming means.

67. A method of making cups, comprising, forming a cup with upward flutes from a sheet of dry and thin flexible material, and rolling a bead outwardly and inwardly around the fluted mouth portion of the cup of dry material, while simultaneously turning over those portions of the flutes which are adjacent to and within the bead.

In testimony whereof I hereunto affix my signature.

CHARLES S. BATDORF